(12) United States Patent
Jung et al.

(10) Patent No.: US 9,716,836 B2
(45) Date of Patent: *Jul. 25, 2017

(54) MOBILE TERMINAL AND CONTROL METHOD FOR DISPLAYING IMAGES FROM A CAMERA ON A TOUCH SCREEN OF THE MOBILE TERMINAL

(71) Applicant: LG ELECTRONICS INC., Seoul (KR)

(72) Inventors: Hayang Jung, Seoul (KR); Mijin Cho, Seoul (KR); Hyungtae Jang, Seoul (KR); Suyoung Lee, Seoul (KR); Jihye Yu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/088,956

(22) Filed: Apr. 1, 2016

(65) Prior Publication Data

US 2016/0219224 A1    Jul. 28, 2016

Related U.S. Application Data

(63) Continuation of application No. 13/875,334, filed on May 2, 2013.

(30) Foreign Application Priority Data

Oct. 31, 2012 (KR) .................. 10-2012-0122516

(51) Int. Cl.
H04N 5/232 (2006.01)
G06F 3/0484 (2013.01)
(Continued)

(52) U.S. Cl.
CPC ....... H04N 5/23293 (2013.01); G06F 3/0412 (2013.01); G06F 3/0416 (2013.01);
(Continued)

(58) Field of Classification Search
CPC ......... H04N 5/232; G06F 3/017; G06F 3/013; G06F 3/011
(Continued)

(56) References Cited

U.S. PATENT DOCUMENTS 6,556,243 B1    4/2003   Dotsubo
6,621,524 B1    9/2003   Iijima et al.
(Continued)

FOREIGN PATENT DOCUMENTS

CN    101639760        2/2010
CN    101808193 A      8/2010
(Continued)

OTHER PUBLICATIONS

U.S. Office Action dated Jul. 18, 2014 issued in co-pending U.S. Appl. No. 13/875,334.
(Continued)

*Primary Examiner* — Lin Ye
*Assistant Examiner* — Chan Nguyen
(74) *Attorney, Agent, or Firm* — KED & Associates, LLP

(57) ABSTRACT

A mobile terminal capable of sensing a touch input, and a control method thereof are provided. The mobile terminal includes: a camera unit configured to receive an image in a camera mode; a display unit configured to sense a touch input; a control unit configured to designate a region on the basis of a touch input sensed by the display unit, execute the camera mode when a region is designated, control the camera unit to capture the received image, and display the captured image in the designated region.

30 Claims, 20 Drawing Sheets

(51) Int. Cl.
*G06F 3/0481* (2013.01)
*H04N 5/225* (2006.01)
*G06F 3/0488* (2013.01)
*G06F 3/041* (2006.01)
*G06F 3/0482* (2013.01)

(52) U.S. Cl.
CPC .......... *G06F 3/0481* (2013.01); *G06F 3/0482* (2013.01); *G06F 3/0484* (2013.01); *G06F 3/0488* (2013.01); *G06F 3/04817* (2013.01); *G06F 3/04883* (2013.01); *G06F 3/04886* (2013.01); *H04N 5/2258* (2013.01); *H04N 5/23216* (2013.01)

(58) Field of Classification Search
USPC .................................................. 348/211.13
See application file for complete search history.

(56) References Cited

U.S. PATENT DOCUMENTS

| | | |
|---|---|---|
| 2004/0046749 A1 | 3/2004 | Ikeda |
| 2005/0152002 A1 | 7/2005 | Shirakawa |
| 2005/0219384 A1 | 10/2005 | Herberger et al. |
| 2006/0077266 A1 | 4/2006 | Nurmi |
| 2006/0181630 A1 | 8/2006 | Shioji |
| 2008/0036789 A1 | 2/2008 | De Leon |
| 2008/0266414 A1 | 10/2008 | Park |
| 2009/0213086 A1 | 8/2009 | Chae et al. |
| 2010/0058182 A1 | 3/2010 | Jung |
| 2010/0208107 A1 | 8/2010 | Nonaka et al. |
| 2010/0253792 A1 | 10/2010 | Kawaguchi et al. |
| 2010/0293508 A1 | 11/2010 | Hwang et al. |
| 2011/0018827 A1 | 1/2011 | Wang et al. |
| 2011/0085016 A1 | 4/2011 | Kristiansen |
| 2011/0242396 A1 | 10/2011 | Matsuzawa et al. |
| 2011/0304760 A1 | 12/2011 | Lee et al. |
| 2012/0159553 A1 | 6/2012 | Hwang et al. |
| 2013/0053105 A1 | 2/2013 | Lee et al. |
| 2013/0187866 A1 | 7/2013 | Kim et al. |
| 2014/0022405 A1 | 1/2014 | Muhrke et al. |
| 2014/0115455 A1* | 4/2014 | Kim ..................... G06F 3/0482 715/702 |

FOREIGN PATENT DOCUMENTS

| | | |
|---|---|---|
| CN | 102681775 A | 9/2012 |
| EP | 0 944 248 | 9/1999 |

OTHER PUBLICATIONS

U.S. Final Office Action dated Jan. 2, 2015 issued in co-pending U.S. Appl. No. 13/875,334.
U.S. Office Action dated Jun. 23, 2015 issued in co-pending U.S. Appl. No. 13/875,334.
U.S. Final Office Action dated Nov. 13, 2015 issued in co-pending U.S. Appl. No. 13/875,334.
Chinese Office Action dated Aug. 31, 2016 issued in Application No. 201310311337.X.
M. K. Goel et al.: "A Diagram Editing on Interactive Displays Using Multi-touch and Pen Gestures"; Jan. 1, 2010; pp. 182-196; XP 055314179; retrieved from the Internet: URL: http://rd.springer.com/content/pdf/10.1007/978-3-642-14600-8_18.pdf *the whole document*.
Mathias Frisch et al.: "Neat: A Set of Flexible Tools and Gestures for Layout Tasks on Interactive Displays"; Proceedings of the ACM International Conference on Interactive Tabletops and Surfaces, ITS '11; Jan. 1, 2011; p. 1; XP055314167; New York, NY, US; DOI: 10.1145/2076354.2076356; ISBN: 978-1-4503-0871-7 *the whole document*.
Samsung Mobile MX: "Tutorial Galaxy Tab Polaris Office"; Nov. 8, 2011, pp. 1-4; XP054976859; retrieved from the Internet: URL: https://www.youtube.com/watch?v=Xve7ISICVPU [retrieved on Oct. 25, 2016] *the whole document*.
Anonymous: "Taking Photos Simply Android Developers"; Aug. 31, 2012; XP055314195; https://developer.android.com/training/camera/photobasics.html; retrieved from the Internet: URL:https://web.archive.org/web/20120831065136/http://developer.android.com/training/camera/photobasics.htm [retrieved on Oct. 26, 2016].
Anonymous: "Controlling the Camera Android Developers"; Sep. 1, 2012; XP055314198; http://developer.android.com/training/camera/cameradirect.html] retrieved from the Internet: URL:https://web.archive.org/web/20120901134413/http://developer.android.com/training/camera/cameradirect.htm] [retrieved on Oct. 26, 2016] *the whole document*.
European Search Report dated Nov. 7, 2016 issued in Application No. 13171566.6.

\* cited by examiner

MOBILE TERMINAL AND CONTROL METHOD FOR DISPLAYING IMAGES FROM A CAMERA ON A TOUCH SCREEN OF THE MOBILE TERMINAL

CROSS REFERENCE TO RELATED APPLICATIONS

The present application is a Continuation of co-pending U.S. patent application Ser. No. 13/875,334 filed on May 2, 2013, which claims priority under 35 U.S.C. §119(a) to Korean Patent Application No. 10-2012-0122516, filed on Oct. 31, 2012, whose entire disclosures are hereby incorporated by reference.

BACKGROUND OF THE INVENTION

Field of the Invention

The present invention relates to a mobile terminal and, more particularly, to a mobile terminal capable of sensing a touch input, and a control method thereof.

Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Efforts are ongoing to support and increase the functionality of mobile terminals. Such efforts include software and hardware improvements, as well as changes and improvements in the structural components which form the mobile terminal.

Meanwhile, a terminal may capture an image by using a camera unit. In this case, however, when the user wants to operate the camera unit in a state in which a home screen, a lock screen, or an executed screen of an application is displayed on a display unit, several stages of processes are performed, for which a few seconds are required.

SUMMARY OF THE INVENTION

As aspect of the present invention provides a mobile terminal capable of enhancing user convenience in operating a camera unit, and a control method thereof.

To achieve these and other advantages and in accordance with the purpose of the present invention, as embodied and broadly described herein, the present invention provides in one aspect a mobile terminal including: a camera unit configured to receive an image in a camera mode; a display unit configured to sense a touch input; a control unit configured to designate a region on the basis of a touch input sensed by the display unit, execute the camera mode when a region is designated, control the camera unit to capture the received image, and display the captured image in the designated region.

In an embodiment of the present invention, the display unit may be configured to display screen information, and the control unit may trace a touch input sensed on the screen information, designate the region on the screen information on the basis of the trace of the touch input, and display the designated region such that it is distinguished from other regions of the screen information.

In an embodiment of the present invention, the control unit may move the designated region to a different region of the screen information on the basis of the touch input sensed in the designated region.

In an embodiment of the present invention, when the touch input applied to the designated region is sensed, the control unit may execute the camera mode and display a preview image received by the camera mode in real time in the camera mode, in the designated region.

In an embodiment of the present invention, when a touch input applied to the preview image is sensed, the control unit may control the camera unit to perform capturing on the received image.

In an embodiment of the present invention, when the camera unit performs capturing on the received image, the control unit may display a clip board including a thumbnail image corresponding to the captured image during a pre-set period of time, and when any one of the at least one thumbnail image displayed in the clip board is selected, the control unit may display an image corresponding to the selected thumbnail image in the designated region.

In an embodiment of the present invention, the mobile terminal may further include a memory, wherein when the region is designated, the control unit may display a plurality of icons in the designated region such that whether to display the preview image of the camera unit in the designated region or whether to display an image previously stored in the memory in the designated region can be selected, and may display an image corresponding to an icon selected from the icons in the designated region.

In an embodiment of the present invention, in a state in which an image previously stored in the memory is displayed in the designated region, the control unit may change the image displayed in the designated region into a different image on the basis of a touch input sensed in the designated region.

In an embodiment of the present invention, the control unit may control at least one of zooming and brightness of the image displayed in the designated region on the basis of at least one of length information and direction information of a touch input applied to the designated region.

In an embodiment of the present invention, when a touch input applied to the designated region is sensed, the control unit may display at least one menu icon for activating a particular function with respect to the camera unit and a particular function with respect to the designated region in one region adjacent to the designated region, and when any one of the at least one menu icon is selected, the control unit may perform a particular function corresponding to the selected menu icon.

In an embodiment of the present invention, the particular function with respect to the camera unit may include at least one of a zooming function of the camera unit, a brightness adjusting function of the camera unit, and a menu selection function in the camera mode.

In an embodiment of the present invention, the particular function with respect to the designated region may include at least one of a zooming function of an image displayed in the designated region, a function of deleting the displayed image, and a function of displaying a different image in the designated region.

In an embodiment of the present invention, when a pre-set touch input applied to the screen information is sensed after the region is designated on the screen information, the control unit may further designate regions corresponding to the number of times of sensing the touch input on the screen information.

In an embodiment of the present invention, when first and second regions are designated on the screen information, the control unit may display a first portion of the preview image in the first region and a second portion of the preview image in the second region.

In an embodiment of the present invention, when at least portions of the first and second regions are overlap, the control unit may merge the first and second regions and display the preview image in the merged region.

In an embodiment of the present invention, when the first and second regions are designated on the screen information, the control unit may display images captured by the camera unit at first and second points in time in the first and second regions.

In an embodiment of the present invention, the screen information may include at least one of a home screen, a lock screen, and an e-memo writing screen.

In an embodiment of the present invention, the control unit may trace a touch input sensed on the screen information, and dispose pre-set text data according to the trace of the touch input.

To achieve these and other advantages and in accordance with the purpose of the present invention, as embodied and broadly described herein, the present invention provides in another aspect a control method of a mobile terminal, including: designating a region on the basis of a touch input sensed in a display unit; when the region is designated, executing a camera mode to allow a camera unit to receive an image; controlling the camera unit to perform capturing on the received image; and displaying the captured image in the designated region.

In an embodiment of the present invention, the designating of a region on the basis of a touch input sensed in the display unit may include: tracing a touch input sensed on screen information displayed on the display unit; designating the region on the screen information on the basis of the trace of the touch input; and displaying the designated region such that it is distinguished from other regions of the screen information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
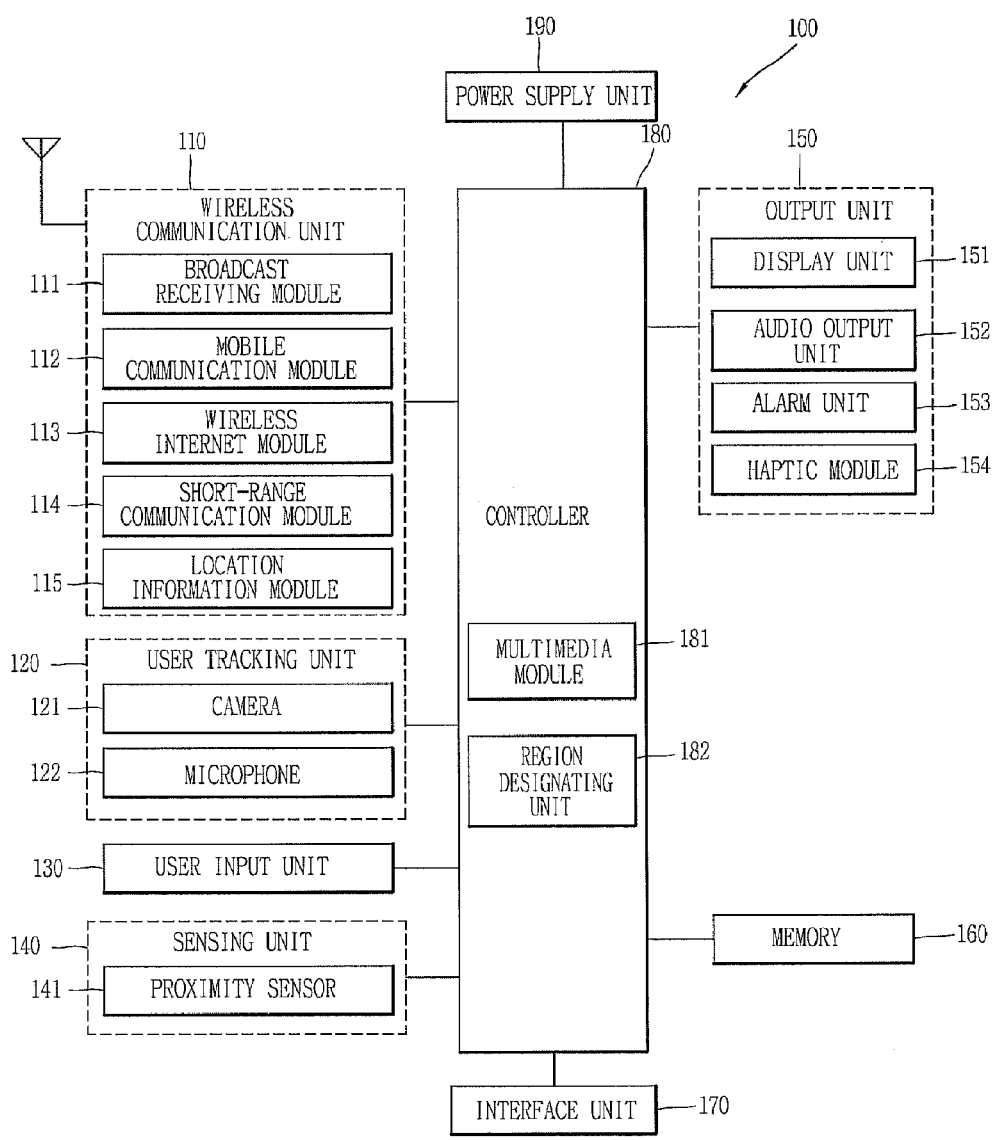
FIG. 1 is a block diagram of a mobile terminal according to an embodiment of the present invention.

FIG. 1 is a block diagram of a mobile terminal 100 according to an embodiment of the present invention. With reference to FIG. 1, the mobile terminal 100 includes a wireless communication unit 110, an A/V (Audio/Video) input unit (referred to as a 'user tracking unit', hereinafter) 120, a user input unit 130, a sensing unit 140, an output unit 150, a memory 160, an interface unit 170, a control unit 180, and a power supply unit 190, etc. FIG. 1 shows the mobile terminal as having various components, but it should be understood that implementing all of the illustrated components is not a requirement. Greater or fewer components may alternatively be implemented.

Hereinafter, the elements 110 to 190 of the mobile terminal 100 will be described in detail as follows.

The wireless communication unit 110 typically includes one or more modules allowing for radio communication between the mobile terminal 100 and a wireless communication system or between the mobile terminal 100 and a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal, and a server. Such radio signals may include a voice call signal, a video call signal or various types of data according to text and/or multimedia message transmission and/or reception.

The wireless Internet module 113 supports wireless Internet access for the mobile terminal 100. This module may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile terminal 100. A typical example of the location information module is a GPS (Global Positioning System).

With reference to FIG. 1, the A/V input unit 120 may include a camera 121 and a microphone 122. The camera 121 processes image frames of still pictures or video obtained by an image sensor in a video capturing mode or an image capturing mode. The image frames processed by the camera 121 may be displayed on a display unit 151. The processed image frames may be stored in the memory 160 or transmitted to the outside via the wireless communication unit 110. Two or more cameras 121 may be provided according to a usage environment.

The microphone 122 may process an audio signal input from an external source into electrical voice data in a phone call mode, a recording mode, a voice recognition mode, and the like. The audio (voice) data processed by the microphone 122 may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad, a jog wheel, a jog switch, and the like.

The sensing unit 140 detects a current status of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. Also, the sensing unit 140 may include a touch sensor (not shown) for sensing a touch operation with respect to the display unit 151.

The touch sensor may have a form of a touch film, a touch sheet, a touch pad, and the like. The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When the touch sensor and the display unit 151 are overlaid in a layered manner, the display unit 151 may function as both an input device and an output device. Such a display unit 151 may also be called a 'touch screen'.

When there is a touch input through the touch screen, a corresponding signal (signals) are transmitted to a touch control unit. The touch control unit processes the signals transmitted from the touch sensor and transmits corresponding data to the control unit 180. Accordingly, the control unit 180 may recognize which portion of the display unit 151 has been touched.

When the touch screen is an electrostatic type touch screen, the touch screen may detect proximity of an object (or a detection target) on the basis of a change in an electric field according to the proximity of the object. Such a touch screen may be classified as a proximity sensor 141.

The proximity sensor 141 is a sensor for detecting the presence or absence of an object by using the force of electromagnetism or infrared rays without a physical contact. Thus, the proximity sensor 141 has a considerably longer life span compared with a contact type sensor, and it can be utilized for various purposes. Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like.

In the following description, for the sake of explanation, recognition of an object to be sensed positioned to be close to the touch screen will be called a 'proximity touch', while recognition of actual contacting of an object to be sensed on the touch screen will be called a 'contact touch'.

The proximity sensor 141 senses a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner. The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. A video signal or an audio signal may also be output through the display unit 151 or the audio output module 152, so the display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the control unit 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The control unit 180 typically controls the general operations of the mobile terminal. For example, the control unit 180 performs controlling and processing associated with voice calls, data communications, video calls, and the like. The control unit 180 may include a multimedia module 181 for reproducing multimedia data. The multimedia module 181 may be configured within the control unit 180 or may be configured to be separated from the control unit 180. The control unit 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the control unit 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, control units, micro-control units, microprocessors, electronic units designed to perform the functions described herein. In some cases, such embodiments may be implemented by the control unit 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the control unit 180.

Hereinafter, a method of processing a user input with respect to the mobile terminal 100 will be described.

The user input unit 130 is manipulated to receive a command for controlling the operation of the mobile terminal 100 and may include a plurality of manipulation units. The manipulation units may be generally referred to as a manipulating portion, and various methods and techniques can be employed for the manipulation portion so long as they can be operated by the user in a tactile manner.

Various types of visual information may be displayed on the display unit 151. The information may be displayed in the form of character, number, symbol, graphic, icon, etc. In order to input the information, at least one of the character, number, symbol, graphic and icon is displayed in a certain arrangement so as to be implemented in the form of a keypad. Such keypad may be so-called 'soft key'.

The display unit 151 may be operated as a whole region or may be divided into a plurality of regions and accordingly operated. In the latter case, the plurality of regions may be operation in association with each other. For example, an output window and an input window may be displayed at upper and lower portions of the display unit 151, respectively. The output window and the input window are regions allotted for outputting or inputting information, respectively. Soft keys including numbers for inputting a phone number, or the like, may be outputted to the input window. When the soft key is touched, a number corresponding to the touched soft key is displayed on the output window. When the manipulation unit is manipulated, a call connection with respect to a phone number displayed on the output window is attempted, or text displayed on the output window may be input to an application.

The display unit 151 or the touch pad may be configured to sense touch scrolling. The user may move a cursor or a pointer positioned on an entity, e.g., an icon or the like, displayed on the display unit 151 by scrolling the display unit 151 or the touch pad. In addition, when the user moves his fingers on the display unit 151 or the touch pad, a path along which the user's fingers move may be visually displayed on the display unit 151. This may be useful in editing an image displayed on the display unit 151.

One function of the terminal may be executed in case where the display unit 151 and the touch pad are touched together within a certain time range. The both touches may be clamping the terminal body with the user's thumb and index finger. The one function executed in this case may be, for example, activation or deactivation of the display unit 151 or the touch pad.

Figure 2A:
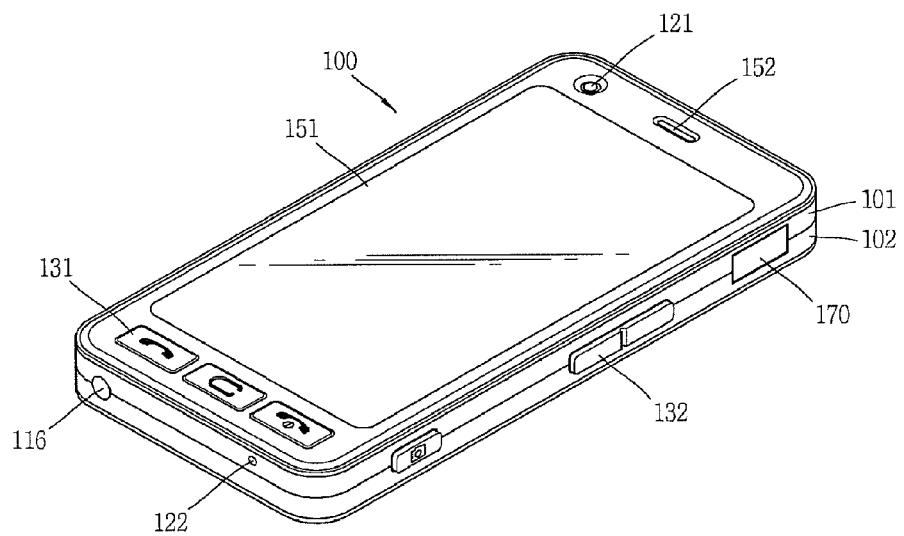
FIGS. 2A and 2B are perspective views illustrating the exterior of the mobile terminal according to an embodiment of the present invention, respectively.
Figure 2B:
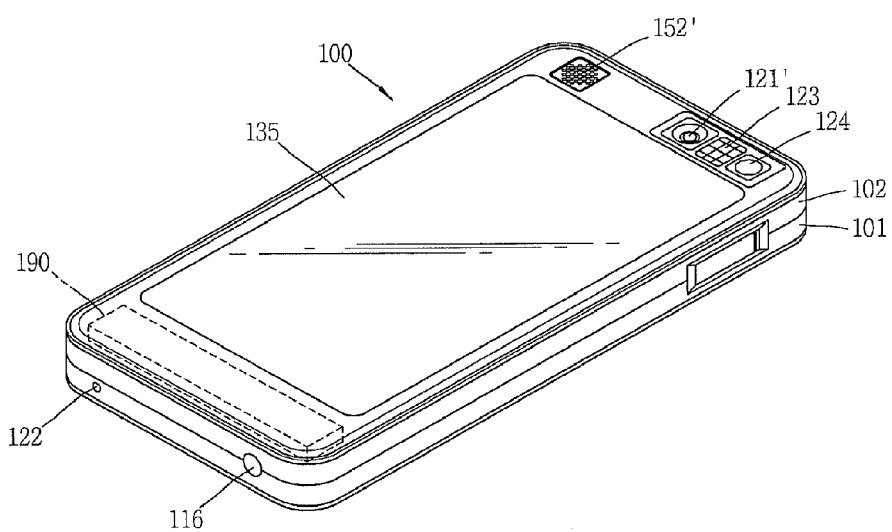

FIGS. 2A and 2B are perspective views showing an external appearance of the mobile terminal 100 according to an embodiment of the present invention, respectively. Specifically, FIG. 2A shows a front surface and one lateral surface of the mobile terminal 100, and FIG. 2B shows a rear surface and another lateral surface of the mobile terminal 100.

With reference to FIG. 2A, the mobile terminal 100 has a bar type terminal body. However, without being limited thereto, the present invention may also be applicable to a slide type mobile terminal, a folder type mobile terminal, a swing type mobile terminal, a swivel type mobile terminal, and the like, in which two or more bodies are coupled to be movable relatively.

The terminal body includes a case (or casing, housing, cover, etc.) constituting an external appearance of the terminal body. The case may be divided into a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, and the user input unit 130 (please see FIG. 1), the microphone 122, the interface 170, and the like, may be located on the terminal body, namely, mainly, on the front case 101.

The display unit 151 occupies the most portion of the front surface of the front case 101. The audio output module 152 and the camera 121 are disposed at a region adjacent to one end portion of the display unit 151, and a first user input unit 131 and the microphone 122 are disposed at a region adjacent to the other end portion of the display unit 151. A second user input unit 132 and the interface 170 may be disposed on the sides of the front case 101 and the rear case 102.

The user input unit 130 is manipulated to receive commands for controlling the operation of the mobile terminal 100, and may include a plurality of manipulation units 131 and 132.

The first or second manipulation unit 131 or 132 may receive various commands. For example, the first manipulation unit may receive commands such as start, end, scroll, or the like, and the second manipulation unit 132 may receive commands such as adjustment of size of a sound outputted from the audio output module 152, conversion to a touch recognition mode of the display unit 151, and the like.

With reference to FIG. 2B, a rear camera 121' may additionally be disposed on a rear surface of the terminal body, namely, on the rear case 102. The rear camera 121' may have an image capture direction which is substantially opposite to that of the camera 121 (please see FIG. 2A), and may support a different number of pixels (i.e., have a different resolution) than the front camera 121.

For example, the front camera 121 may have a relatively small number of pixels, and the rear camera 121' may have a relatively large number of pixels. Thus, the use of the front camera 121 for a video call can reduce the size of transmission data in case of capturing the user's face and transmitting the captured image to a counterpart in real time. Meanwhile, the rear camera 121' may be used for the purpose of storing a high quality image.

Meanwhile, the cameras 121 and 121' may be installed on the terminal such that they are rotated or popped up.

A flash 123 and a mirror 124 may be additionally disposed adjacent to the camera 121'. When the user captures an image of the subject with the rear camera 121', the flash 123 illuminates the subject. The mirror 124 allows the user to see himself when he wants to capture his own image (i.e., self-image capturing) by using the rear camera 121'.

An audio output unit 152' may be additionally disposed on the rear surface of the terminal body. The rear audio output unit 152' may implement a stereoscopic function along with the audio output module 152 (please see FIG. 2A), and may be used for implementing a speaker phone mode during call communication.

A broadcast signal receiving antenna 116 may be additionally disposed on the side of the terminal body in addition to an antenna that supports call communications. The antenna 116 forming a portion of the broadcast reception module 111 (please see FIG. 1) may be installed to be drawn out of the terminal body.

A power supply unit 190 for supplying power to the mobile terminal 100 may be installed on the terminal body. The power supply unit 190 may be installed in the terminal body or may be directly detached from the outside of the terminal body.

A touch pad 135 for detecting a touch may be additionally mounted on the rear case 102. Such touch pad may be configured to be light-transmissive like the display unit 151 (please see FIG. 2A). Also, a rear display unit may be additionally mounted on the touch pad 135 in order to output visual information. In this case, information output from both of the front display unit 151 and the rear display unit may be controlled by the touch pad 135.

The touch pad 135 is operated in relation to the display unit 151. The touch pad 135 may be disposed to be parallel to the rear side of the display unit 151. The touch pad 135 may have the same size as or smaller than the display unit 151.

Meanwhile, the mobile terminal 100 may capture an image by using the camera unit 121. In this case, however, when a user wants to operate the camera unit 121 in a state in which a home screen, a lock screen, or an executed screen of an application is displayed on the display unit 151, several stages of processes are performed, for which a few seconds are required.

Thus, hereinafter, the mobile terminal 100 capable of enhancing user convenience in operating the camera unit 121 and a control method thereof will be described with reference to the accompanying drawings.

Figure 3:
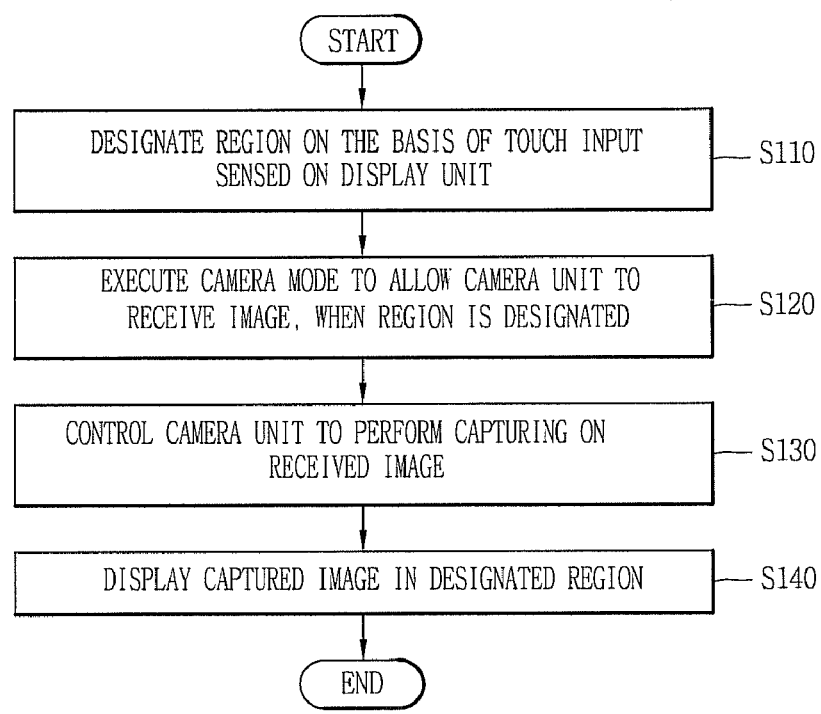
FIG. 3 is a flow chart illustrating a process of a control method of a mobile terminal according to an embodiment of the present invention.

FIG. 3 is a flow chart illustrating a process of a control method of a mobile terminal according to an embodiment of the present invention. The mobile terminal includes the camera unit 121 (please see FIG. 1), the display unit 151 (please see FIG. 1), and a control unit 180 (please see FIG. 1).

Referring to FIG. 3, step (S110) of designating a region on the basis of a touch input sensed in the display unit 151 is performed.

At least one of a home screen, a lock screen, or an executed screen with respect to an application may be displayed on the display unit 151. Also, at least one of a page including an image or text, a Web page, an e-mail, an e-document, and contents of a social network service (SNS). Here, screen information refers to every information displayed in at least a partial region of the display unit 151.

The control unit 180 may designate a region on screen information on the basis of a touch input sensed on the screen information displayed on the display unit 151.

In detail, the control unit 180 may trace a touch input sensed on the screen information and designate a region on the screen information on the basis of the trace of the touch input. Meanwhile, the control unit 180 may also designate a region on the screen information on the basis of a point at which a touch input sensed on the screen information starts and a point at which the touch input is released.

The control unit 180 may display the designated region such that it is distinguished from other regions of the screen information. For example, the control unit 180 may display the contour of the designated region on the display unit 151. Also, the control unit 180 may color the interior of the designated region with a particular color.

Thereafter, when the region is designated, a camera mode is executed to allow the camera unit 121 to receive an image in step S120.

In detail, when a pre-set touch input (e.g., a long touch input) is sensed in the designated region, the control unit 180 may execute the camera mode to allow the camera unit 121 to be activated. When the camera mode is executed, the camera unit 121 may sense an image from the outside to receive the same. An image (hereinafter, referred to as a 'preview image') received by the camera unit 121 in real time may be displayed in the designated region.

Here, the preview image refers to an image corresponding to a subject input through the camera unit 121. Here, the subject refers to an object whose image is captured, e.g., an object that is photographed, which may be a person or a thing.

Also, in the camera mode, only any one of a plurality of cameras included in the camera unit 121 may be activated or the plurality of cameras may be simultaneously activated according to a user selection or a setting of the control unit 180.

Hereinafter, a method for capturing an image by activating a single camera according to an embodiment of the present invention will be described as an example. However, the mobile terminal 100 capable of capturing a 3D image has a plurality of cameras, i.e., generally, two cameras, formed on one surface thereof, so, in this case, the plurality of cameras may simultaneously be activated.

Thereafter, the camera unit 121 is controlled to perform capturing on the received image in step S130.

In a state in which the preview image is displayed in the designated region, when a touch input applied to the preview imager is sensed, the control unit 180 may control the camera unit 121 to perform capturing on the received image. Accordingly, the camera unit 121 may capture an image.

Thereafter, the captured image is displayed in the designated region in step S140.

The control unit 180 may display the image captured by the camera unit 121 in the designated region. Here, the control unit 180 may display a clip board including a thumbnail image corresponding to the captured image on the display unit 151 during a pre-set period of time. The clip board may include thumbnail images corresponding to a plurality of images, respectively. When any one of the thumbnail images is selected, the control unit 180 may display an image corresponding to the selected thumbnail image in the designated region.

Figure 4:
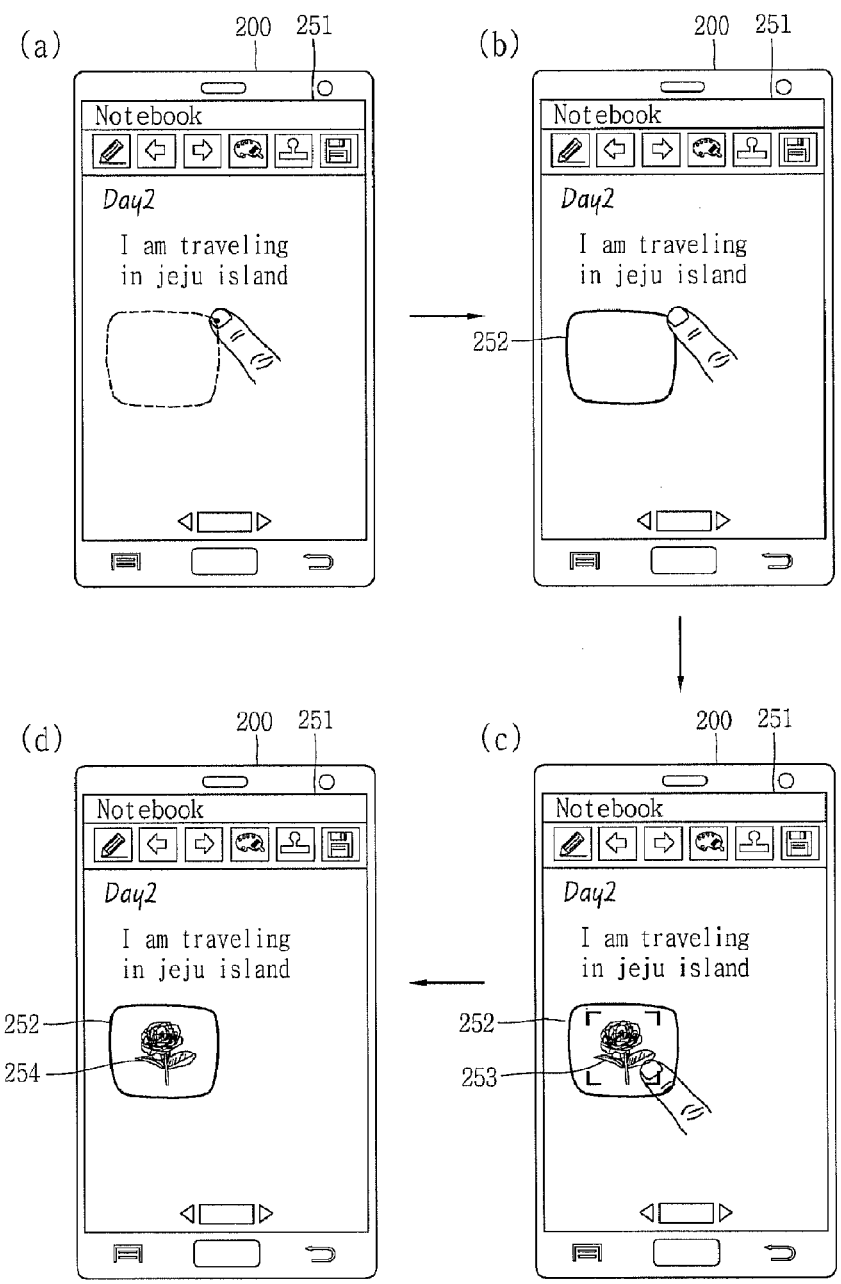
FIGS. 4 through 20 are conceptual views illustrating operational examples of a mobile terminal in FIG. 3, respectively.

As described above, in the case of the mobile terminal 100 according to an embodiment of the present invention, when a region is designated by a touch input sensed on the display unit 151, the camera unit 121 may be immediately operated. Namely, in a state in which certain screen information is displayed on the display unit 151, an entry path for operating the camera unit 121 may be provided through a simplified control operation. Thus, the user may be able to operate the camera unit 121 without having to perform complicated manipulation during multitasking. Thus, user convenience can be enhanced FIG. 4 is a conceptual view illustrating an operational example of a mobile terminal in FIG. 3. A mobile terminal 200 includes the camera unit 121 (please see FIG. 1), a display unit 251 (please see FIG. 1), and the control unit 180 (please see FIG. 1).

Referring to FIG. 4(a), the display unit 251 may display screen information. As illustrated, the display unit 251 may display an executed screen with respect to an electronic note application as screen information. Although not shown, the display unit 251 may display a home screen, a lock screen, or the like, as screen information.

The display unit 251 may be configured to allow for a touch input. When the user applies a touch input (e.g., a drag input) to screen information, the control unit 180 may trace the touch input.

Thereafter, referring to FIG. 4(b), the control unit 180 may designate a region 252 on the screen information on the basis of the trace of the touch input. As illustrated, the control unit 180 may display the designated region 252 such that it is distinguished from other regions of the screen information. For example, the control unit 180 may display the contour of the designated region 252 on the display unit 251. Although not shown, the control unit 180 may color the interior of the designated region with a particular color.

Thereafter, referring to FIG. 4(c), when a pre-set touch input (e.g., a long touch input) is sensed in the designated region, the control unit 180 may execute a camera mode. Here, the camera mode may refer to a mode in which the camera unit 121 is operated to sense an image from the outside. Namely, as the camera mode is executed, the camera unit 121 may be activated.

As illustrated, when the camera mode is executed, the camera unit 121 may receive an image from the outside in real time. The image 253 received in real time (hereinafter, referred to as a 'preview image') may be displayed in the designated region 252.

Thereafter, when a touch input applied to the preview image 253 is sensed, referring to FIG. 4(d), the control unit 180 may control the camera unit 121 to perform capturing on the received image. Accordingly, the camera unit 121 may capture the image. Also, the captured image 254 may be displayed in the designated region 252.

As a result, the captured image 254 may be included in the designated region 252 and displayed on an executed screen of the electronic note application. By applying touch inputs to the executed screen of the electronic note application several times, the user may insert the captured image 254 from the camera unit 121 to the electronic note.

Figure 5:
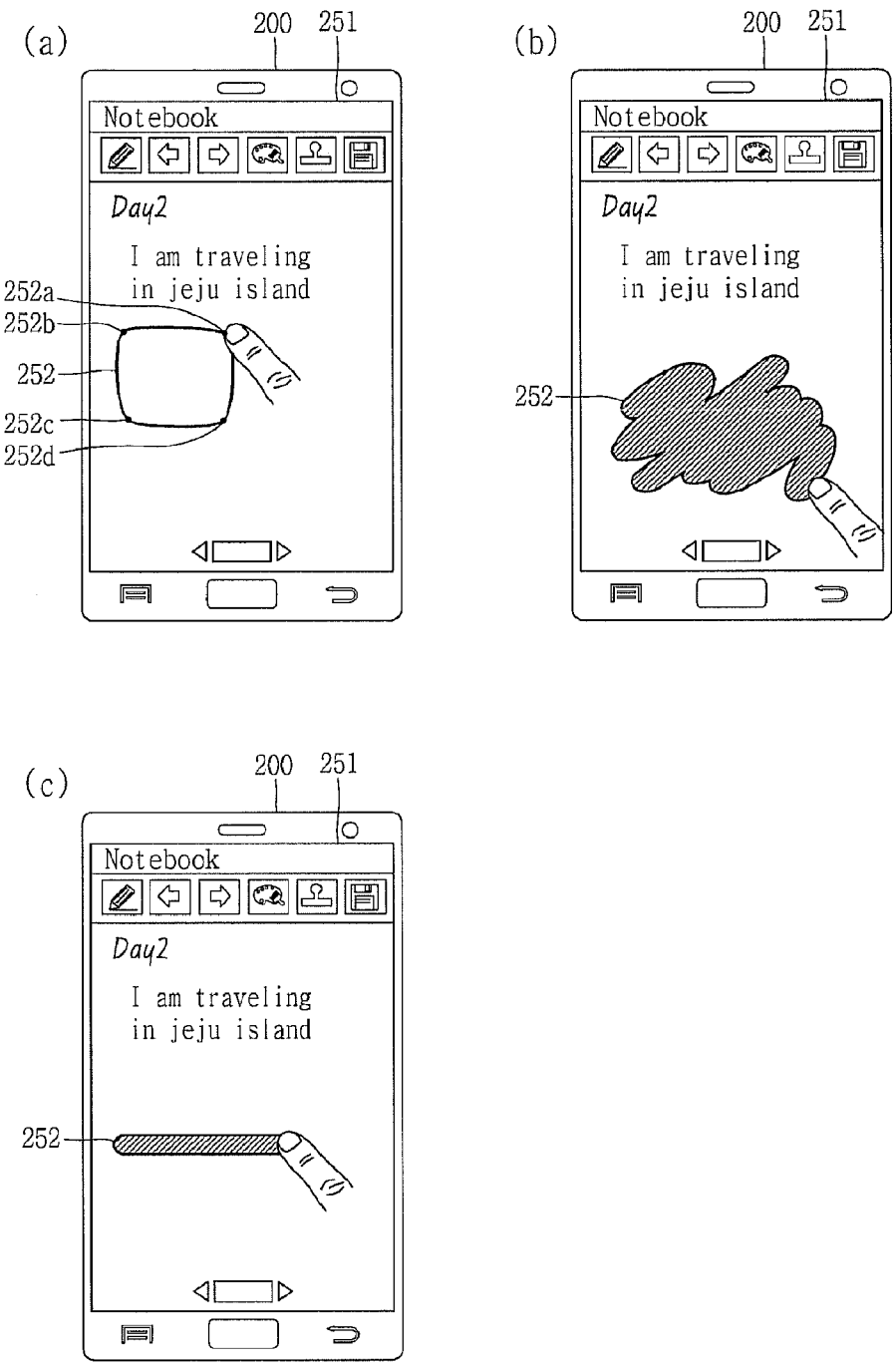

FIG. 5 is a conceptual view illustrating an operational example of the mobile terminal 200 in FIG. 3. The mobile terminal 200 includes the camera unit 121 (please see FIG. 1), the display unit 251 (please see FIG. 1), and the control unit 180 (please see FIG. 1).

Referring to FIG. 5, the control unit 180 may designate a region 252 on screen information on the basis of a trace of the touch input applied to the screen information.

Namely, referring to FIG. 5(a), when the user applies a drag input sequentially connecting first to fourth spots 252a to 252d, the control unit 180 may designate the region 252 within the contour connecting the first to fourth spots 252a to 252d. Also, by displaying the contour connecting the first to fourth spots 252a to 252d on the screen information, the control unit 180 may distinguish the designated region 252 from other regions.

Also, referring to FIGS. 5(b) and 5(c), when the user applies a drag input applied in a certain direction on the user information, the control unit 180 may designate the spots in which the drag input has been sensed, as the region 252. The drag input may be applied by the user's finger or by the user's palm. In this case, a larger area may be designated as the region 252.

Meanwhile, although not shown, the control unit 180 may detect a start spot and a release spot of a touch input sensed on the screen information, and designate the region 252 on the screen information on the basis of the start spot and the release spot. For example, when first and second touch inputs are sensed on the screen information, the control unit 180 may designate the region 252 including the spots of the first and second touch inputs.

Figure 6:
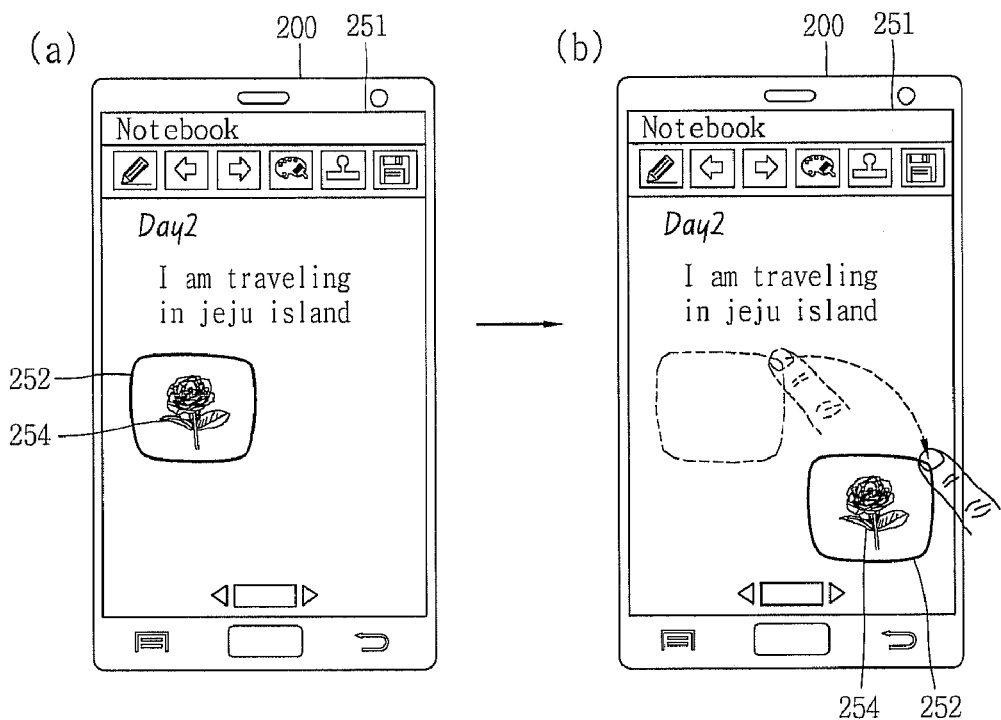

FIG. 6 is a conceptual view illustrating an operational example of the mobile terminal 200 in FIG. 3. The mobile terminal 200 includes the camera unit 121 (please see FIG. 1), the display unit 251 (please see FIG. 1), and the control unit 180 (please see FIG. 1).

Referring to FIG. 6, the control unit 180 may move the designated region 252 to a different region of the screen information on the basis of the touch input sensed in the designated region 252.

In detail, referring to FIG. 6(a), the display unit 251 may display a captured image 254 in the designated region 252.

Here, when a drag input applied to the designated region 252 in a certain direction is sensed, referring to FIG. 6(b), the control unit 180 may move the designated region 252 to a different region of the screen information. Accordingly, the captured image 254 displayed in the designated region 252 may also be moved to the different region of the screen information.

Although the drag input is illustrated in the drawing, when a first touch input (e.g., a short touch input) applied to the designated region 252 is sensed and a second touch input (e.g., a short touch input) applied to a different region of the screen information is sensed, the control unit 180 may move the designated region 252 to a spot at which the first touch input has been sensed.

Meanwhile, although not shown, an icon (hereinafter, referred to as a 'deletion icon') corresponding to a function of deleting the designated region 252 may be displayed on the display unit. Here, when the designated region 252 is dragged toward the deletion icon, the control unit 180 may delete the designated region 252. Accordingly, the captured image 254 displayed in the designated region 252 may also be deleted.

Figure 7:
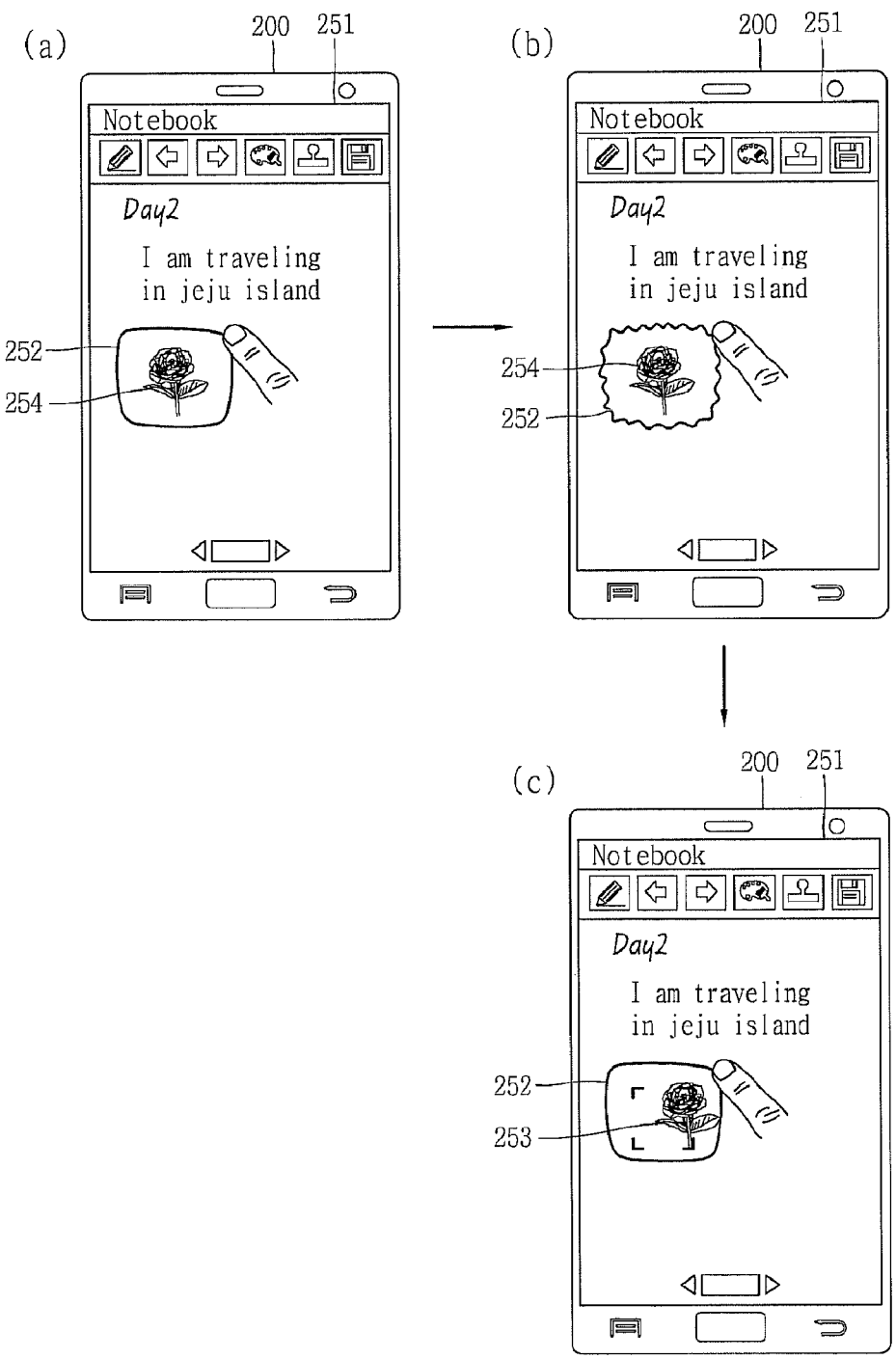

FIG. 7 is a conceptual view illustrating an operational example of the mobile terminal 200 in FIG. 3. The mobile terminal 200 includes the camera unit 121 (please see FIG. 1), the display unit 251 (please see FIG. 1), and the control unit 180 (please see FIG. 1).

Referring to FIG. 7, the control unit 180 may control the camera unit 121 to perform re-capturing an image.

In detail, referring to FIG. 7(a), the display unit 251 may display the captured image 254 in the designated region 252.

Here, referring to FIG. 7(b), when a pre-set touch input (e.g., a touch input of rubbing the contour of the designated region 252) applied to the designated region 252 is sensed, the control unit 180 may provide an effect of shaking the contour of the designated region 252. At the same time, the control unit 180 may execute the camera mode in which the camera unit 121 is activated, again.

Thereafter, referring to FIG. 7(c), as the camera mode is executed again, the camera unit 121 may sense and receive an image from the outside. Accordingly, the image received by the camera unit 121 in real time, namely, the preview image 253, may be displayed in the designated region 252.

Thereafter, although not shown, when a touch input applied to the preview image 253 is sensed, the control unit 180 may control the camera unit 121 to perform capturing on the newly received image. Accordingly, the camera 121 may capture an image.

Figure 8:
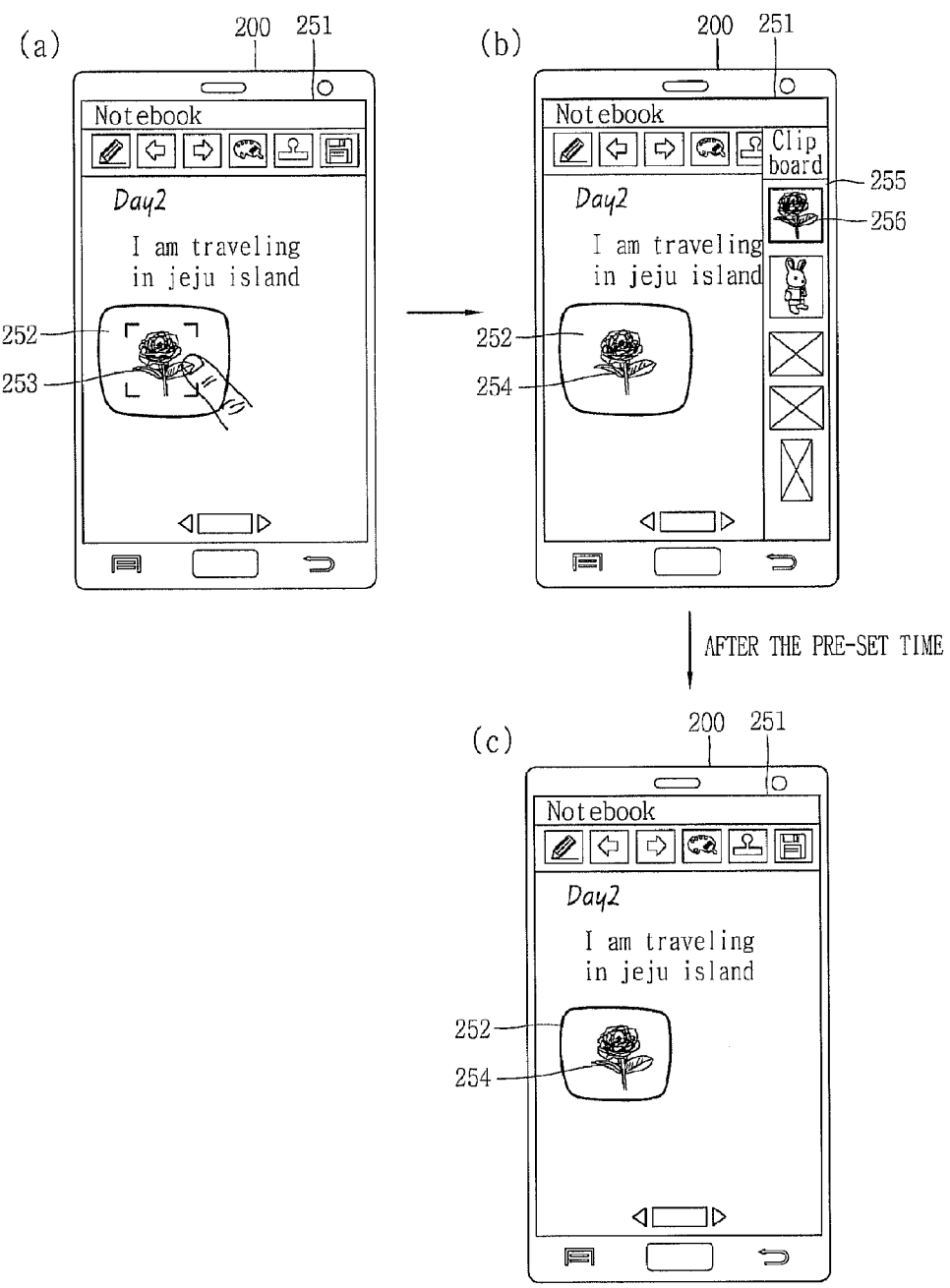

FIG. 8 is a conceptual view illustrating an operational example of the mobile terminal 200 in FIG. 3. The mobile terminal 200 includes the camera unit 121 (please see FIG. 1), the display unit 251 (please see FIG. 1), and the control unit 180 (please see FIG. 1).

Referring to FIG. 8, the control unit 180 may display a clip board 255 including a thumbnail image 256 corresponding to the captured image 252, while displaying the captured image 254 in the designated region 252.

In detail, referring to FIG. 8(a), the display unit 251 may display the image received by the camera unit 121 in real time, i.e., the preview image 253, in the designated region 252.

Here, when a touch input applied to the preview image 253 is sensed, referring to FIG. 8(b), the control unit 180 may control the camera unit 121 to perform capturing on a newly received image. Accordingly, the camera unit 121 may capture an image. The control unit 180 may display the image 254 captured by the camera unit 121 in the designated region 252.

In this case, as illustrated, the control unit 180 may generate the thumbnail image 256 corresponding to the captured image 254, and display the clip board 255 including the thumbnail image 256 on the display unit 251. The clip board 255 may include all of a plurality of thumbnail images corresponding to a plurality of images, respectively, as well as the thumbnail image 256 corresponding to the currently captured image 254.

In this case, although not shown, when any one of the plurality of thumbnail images is selected, an image corresponding to the selected thumbnail image may be displayed in the designated region 255.

Meanwhile, referring to FIG. 8(c), in a state in which the clip board 255 is displayed on the display unit 251, when a pre-set time has lapsed, the clip board 255 may disappear from the display unit 251.

Figure 9:
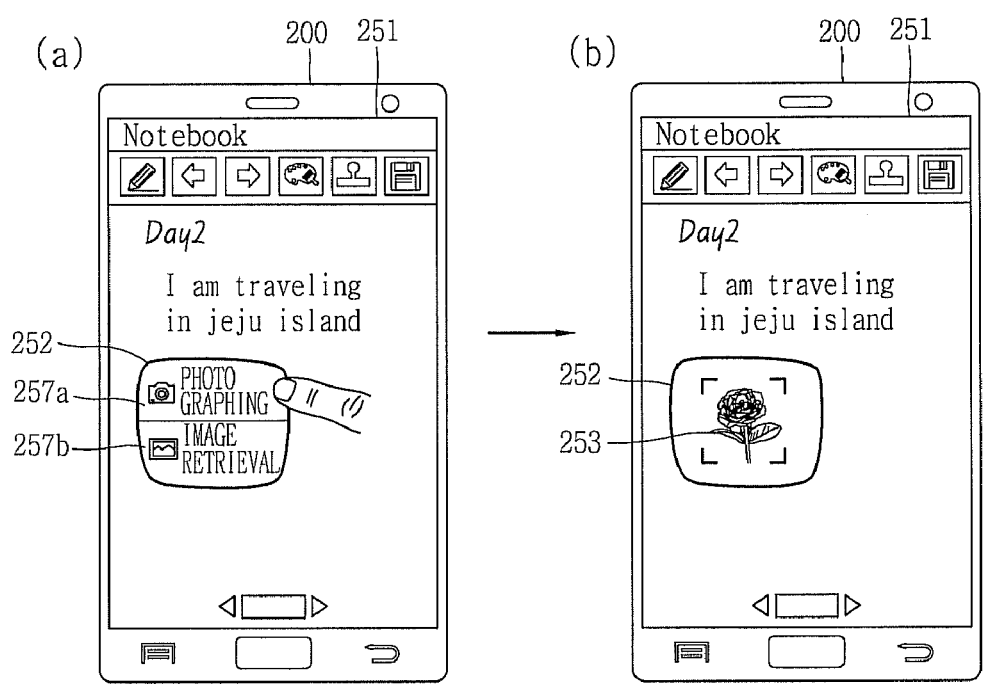
Figure 10:
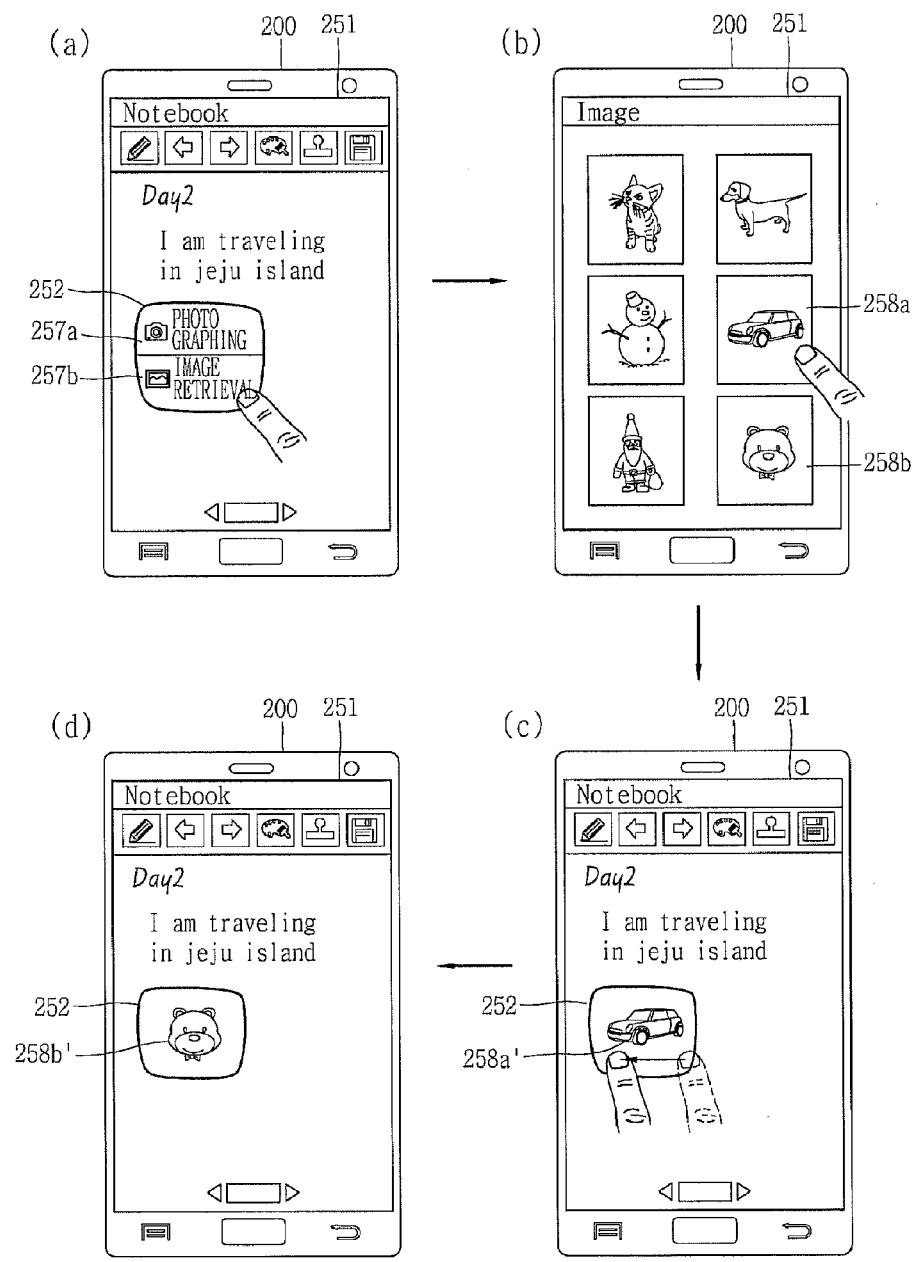

FIGS. 9 and 10 are conceptual views illustrating an operational example of the mobile terminal 200 in FIG. 3, respectively. The mobile terminal 200 includes the camera unit 121 (please see FIG. 1), the display unit 251 (please see FIG. 1), and the control unit 180 (please see FIG. 1).

Referring to FIGS. 9 and 10, the control unit 180 may receive a selection regarding whether to display the preview image 253 of the camera unit in the designated region 252 or whether to display the image previously stored in the memory 160 in the designated region 252 (please see FIG. 1).

In detail, referring to FIG. 9(a), the region 252 may be designated on screen information. The control unit 180 may display a plurality of icons (hereinafter, referred to as a 'photo capture icon' and 'image retrieval icon') 257a and 257b within the designated region 252 in order to receive a selection regarding whether to display the preview image 253 of the camera unit 121 in the designated region 252 or whether to display the image 254 previously stored in the memory 160 in the designated region 252

In this case, when the photo capture icon 257a is selected, referring to FIG. 9(b), the control unit 180 may execute the camera mode in which the camera unit 121 is activated. Accordingly, the preview image 253 received by the camera unit 121 in real time may be displayed in the designated region 252.

Thereafter, although not shown, when a touch input applied to the preview image 253 is sensed, the camera unit 121 may capture an image.

On the other hand, referring to FIG. 10(a), among the photo capture icon 257a and the image retrieval icon 257b displayed within the designated region 252, the image retrieval icon 257b may be selected.

Referring to FIG. 10(b), the control unit 180 may display thumbnail images with respect to the images previously stored in the memory 160, on the display unit 251. In this case, when any one 258a of the thumbnail images is selected, referring to FIG. 10(c), the control unit 180 may display an image 258a corresponding to the selected thumbnail image 258a in the designated region 252.

Thereafter, when a pre-set touch input (e.g., a flick input from the right to the left) applied to the image 258a' displayed in the designated region 252 is sensed, the control unit 180 may change the image 258a' displayed in the designated region 252 to a different image 258b'.

For example, as illustrated in FIG. 10(d), the control unit 180 may display the image 258b' stored subsequently after the image 258a' which has been displayed in the designated region 252, in the designated region 252 on the basis of pre-set order (e.g., stored order) of the images stored in the memory 160.

Figure 11:
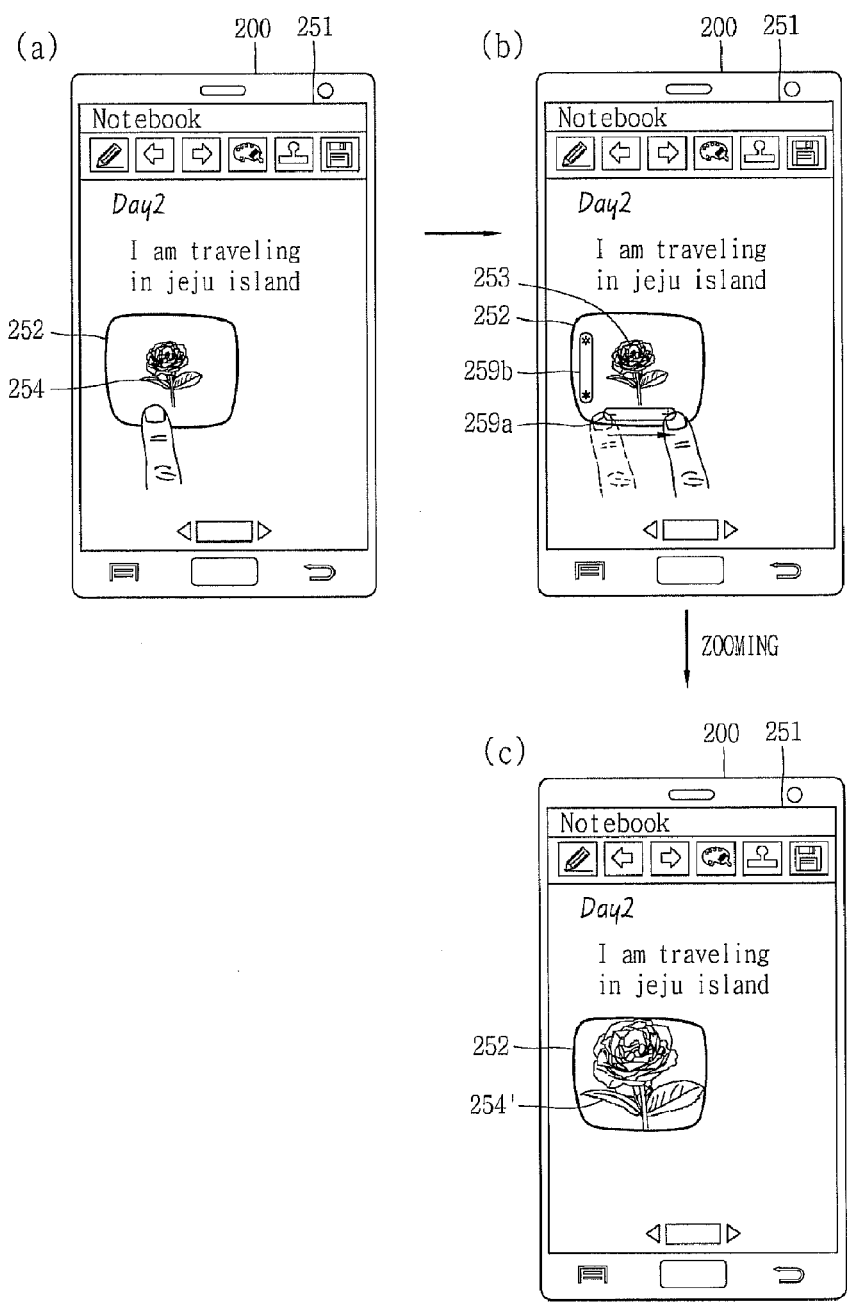
Figure 12:
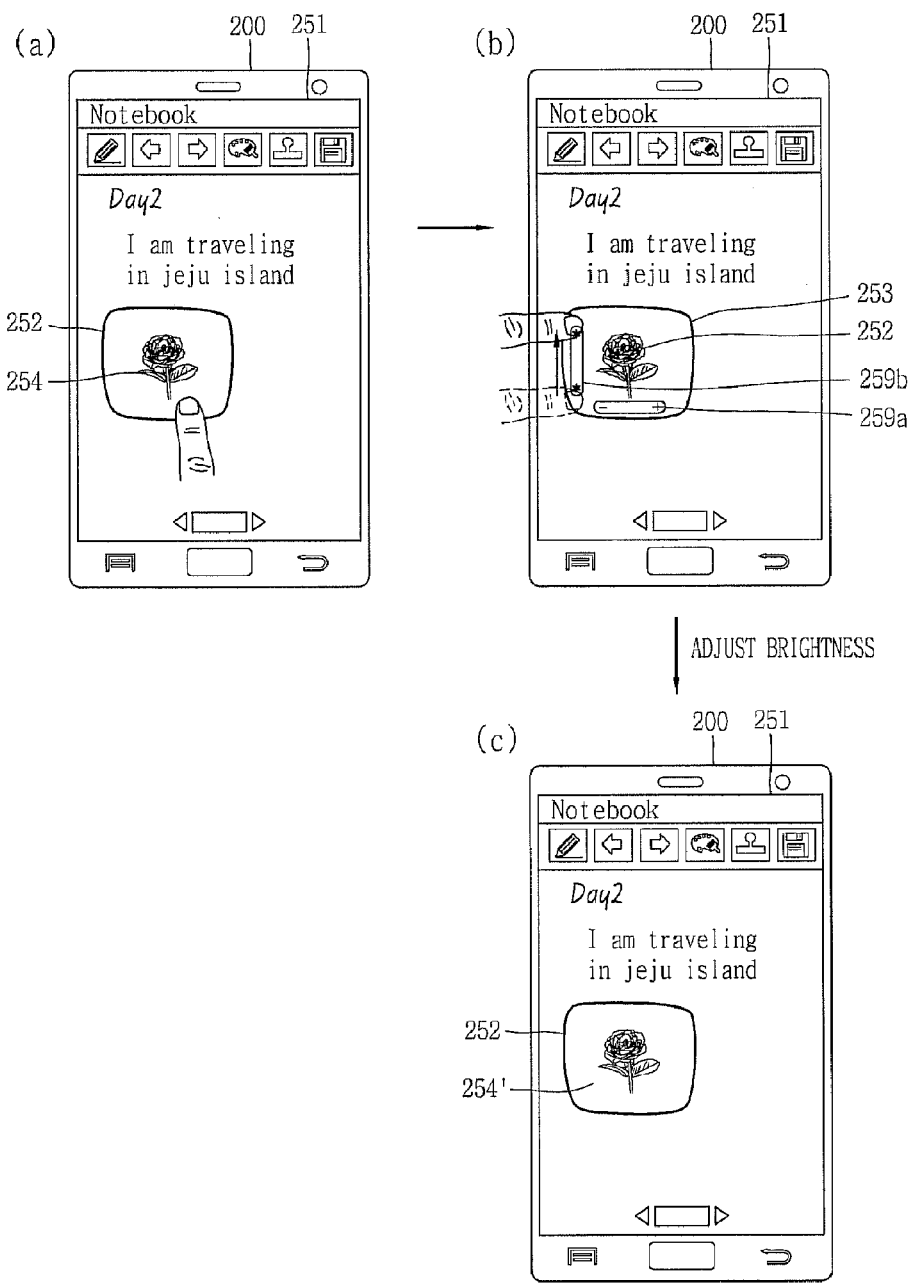
Figure 13:
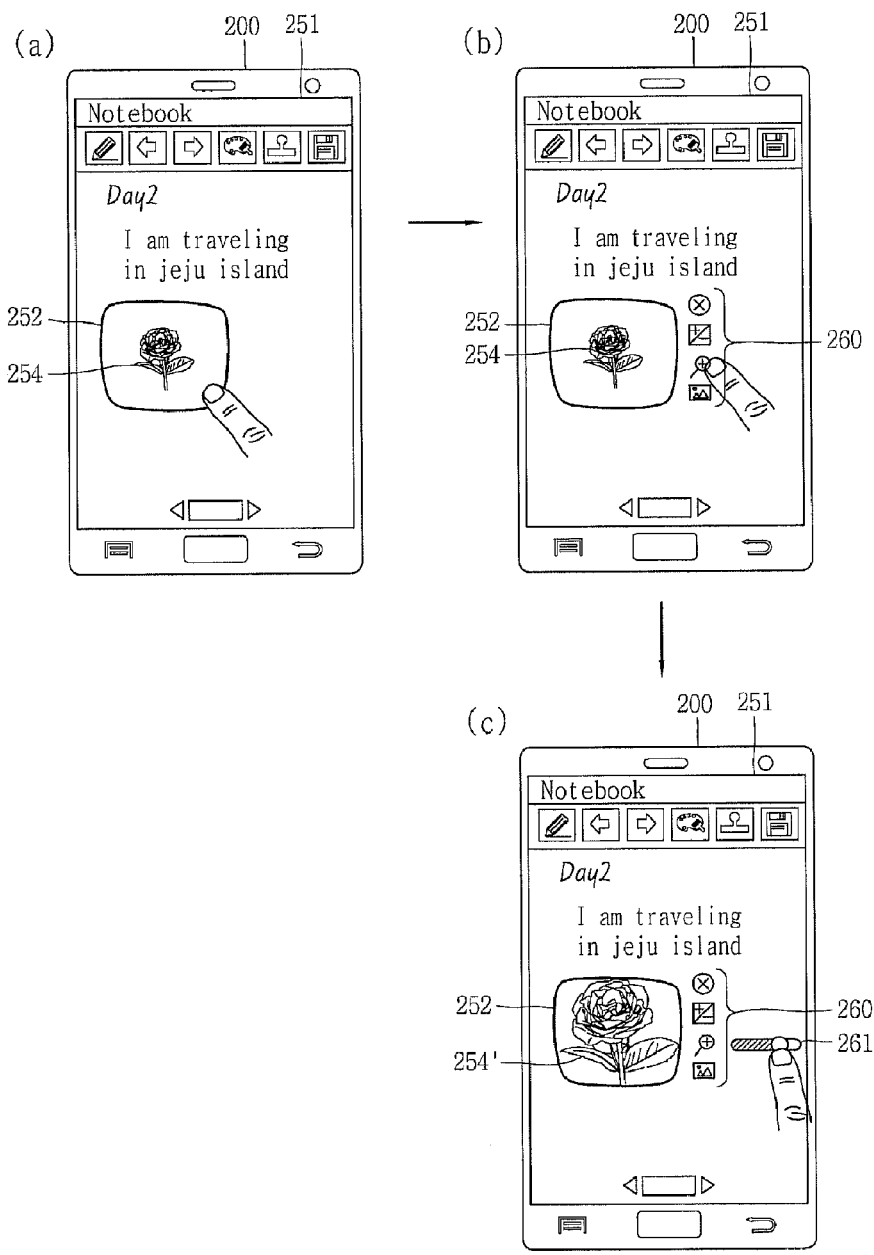

FIGS. 11 to 13 are conceptual views illustrating an operational example of the mobile terminal 200 in FIG. 3, respectively. The mobile terminal 200 includes the camera unit 121 (please see FIG. 1), the display unit 251 (please see FIG. 1), and the control unit 180 (please see FIG. 1).

Referring to FIGS. 11 and 12, the control unit 180 may control at least one of zooming and brightness of the image 254 displayed in the designated region 252 on the basis of attribute information of a touch input applied to the designated region 252.

In detail, referring to FIGS. 11(a) and 12(a), the display unit 251 may display the captured image 254 in the designated region 252. Although the captured image 254 is illustrated in the drawing, an image previously stored in the memory 160 (please see FIG. 1) or an image downloaded from a server may be displayed on the display unit 251.

When a touch input applied to the captured image 254 displayed in the designated region 252, referring to FIG. 11(b), the control unit 180 may generate a control command for controlling zooming and brightness of the captured image 254. Accordingly, as illustrated, the control unit 180 may display a first indicator 259a indicating zooming information of the captured image 254 and a second indicator 259b indicating brightness information in the designated region 252.

Thereafter, when a drag input applied in a first direction (e.g., a direction from the left to the right) is sensed in the designated region 252, referring to FIG. 11(c), the control unit 180 may zoom in the captured image 254 displayed in the designated region 252.

Meanwhile, although not shown, even in a case in which a drag input applied to the first indicator 259a in the first direction is sensed, the control unit 180 may zoom in the captured image 254. Also, even in a case in which a touch input applied to one spot of the first indicator 259a is sensed, the control unit 180 may zoom in or zoom out the captured image 254 by using the zooming information corresponding to the one spot.

Also, although not shown, the control unit 180 may determine a degree of zooming in the captured image 254 on the basis of a length of the drag input applied in the first direction.

Also, in the drawing, a case in which the first indicator 259a disappears as the captured image 254 is zoomed in is illustrated, but the present invention is not limited thereto and the first indicator 259a may be continuously displayed during a pre-set period of time even after the captured image 254 is zoomed in.

Meanwhile, referring to FIG. 12(b), when a drag input applied in a second direction (e.g., in a direction from a lower side to an upper side) is sensed in the designated region 252, referring to FIG. 12(c), the control unit 180 may adjust brightness of the captured image 254 displayed in the designated region 252 such that it is brighter.

Meanwhile, although not shown, even in a case in which a drag input applied to the second indicator 259a in the second direction is sensed, the control unit 180 may adjust brightness of the captured image 254. Also, even in a case in which a touch input applied to one spot of the second indicator 259b is sensed, the control unit 180 may adjust brightness of the captured image 254 by using brightness information corresponding to the one spot.

Also, the case in which the second indicator 259b disappears as the brightness of the captured image 254 is adjusted is illustrated in the drawing, but the present invention is not limited thereto and the second indicator 259b may be continuously displayed during a pre-set period of time even after the brightness of the captured image 254 is adjusted.

Referring to FIG. 13, the control unit 180 may display menu icons 260 for activating particular functions with respect to the camera unit 121 or particular functions with respect to the designated region 252, in a region adjacent to the designated region 252.

In detail, referring to FIGS. 13(a) and 13(b), when a touch input applied to the designated region 252 or the captured image 254 is sensed, the control unit 180 may display one or more menu icons 260 for activating particular functions with respect to the camera unit 121 and particular functions with respect to the designated region 252, in a region adjacent to the designated region 252.

Here, the menu icons 260 may include a plurality of icons corresponding to a plurality of particular functions.

For example, particular functions with respect to the camera unit 121 may include at least one of a zooming function, a brightness adjusting function, and a function of selecting a menu in a camera mode.

Also, the particular functions with respect to the designated region 252 may include at least one of a function of zooming the image 254 displayed in the designated region 252, a function of deleting the displayed image 254, and a function of displaying a different image in the designated region 252.

In a case in which one of the functions, e.g., an icon (hereinafter, referred to as a 'zoom in icon') corresponding to a function of zooming in the captured image 254, is selected, referring to FIG. 13(c), the control unit 180 may zoom in the captured image 254.

Also, as illustrated, in order to allow the user to be informed about zooming of the captured image 254, the control unit 180 may generate an indicator 261 indicating zooming information of the captured image 254 and display the indicator 261 in a region adjacent to the menu icons 260. Here, the indicator 261 may be displayed during a pre-set period of time, and may disappear after the lapse of the pre-set period of time.

Figure 14:
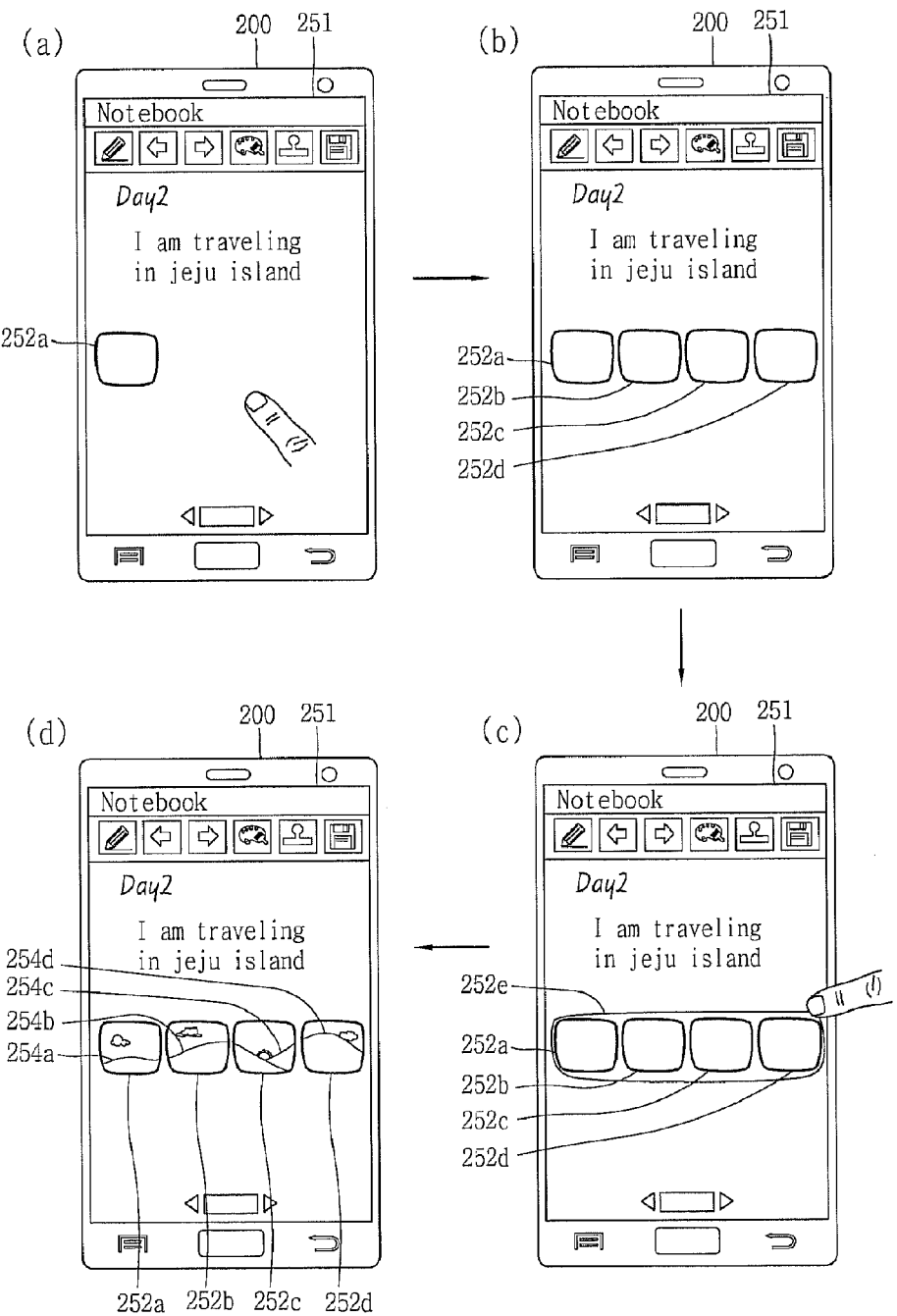
Figure 15:
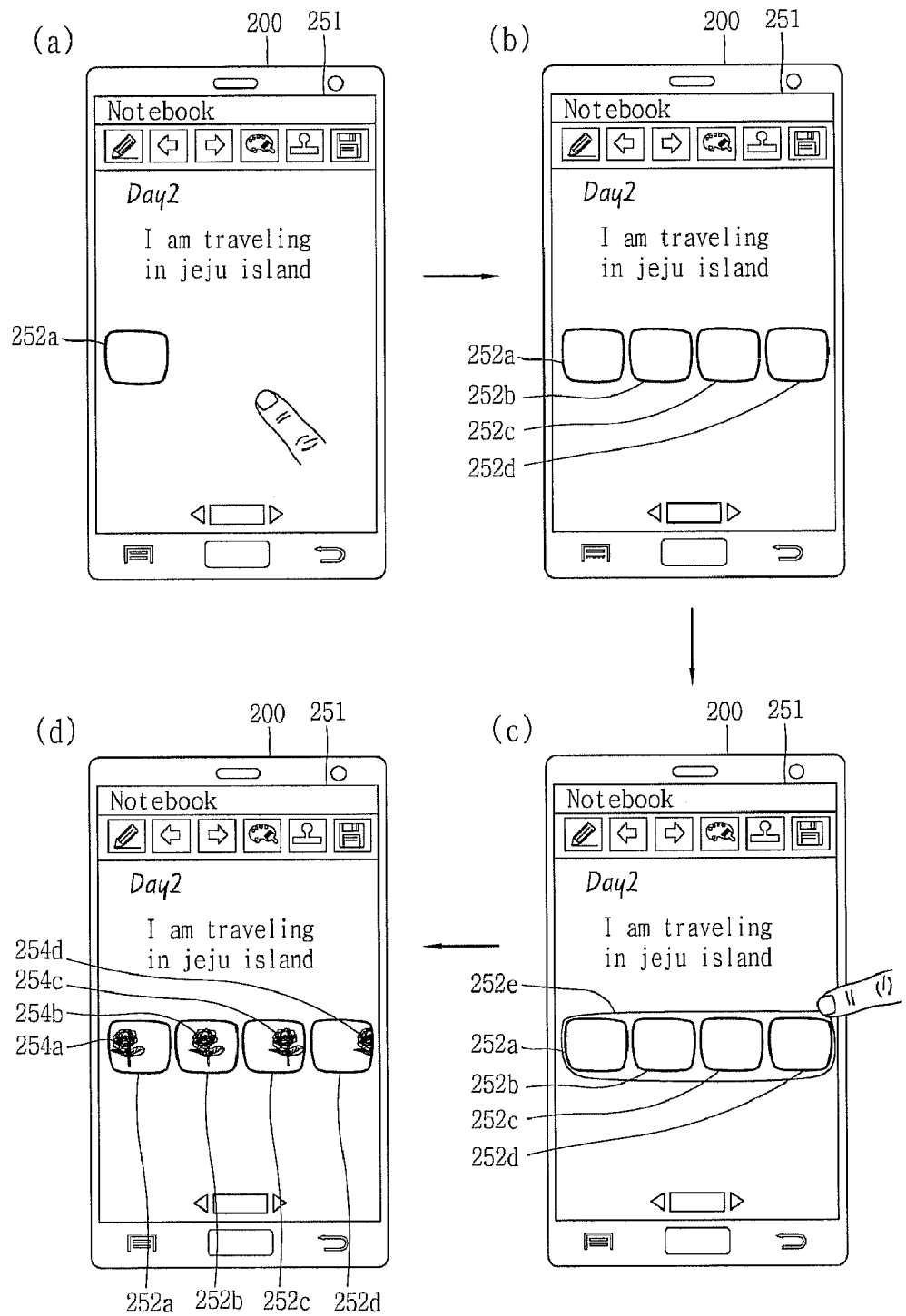
Figure 16:
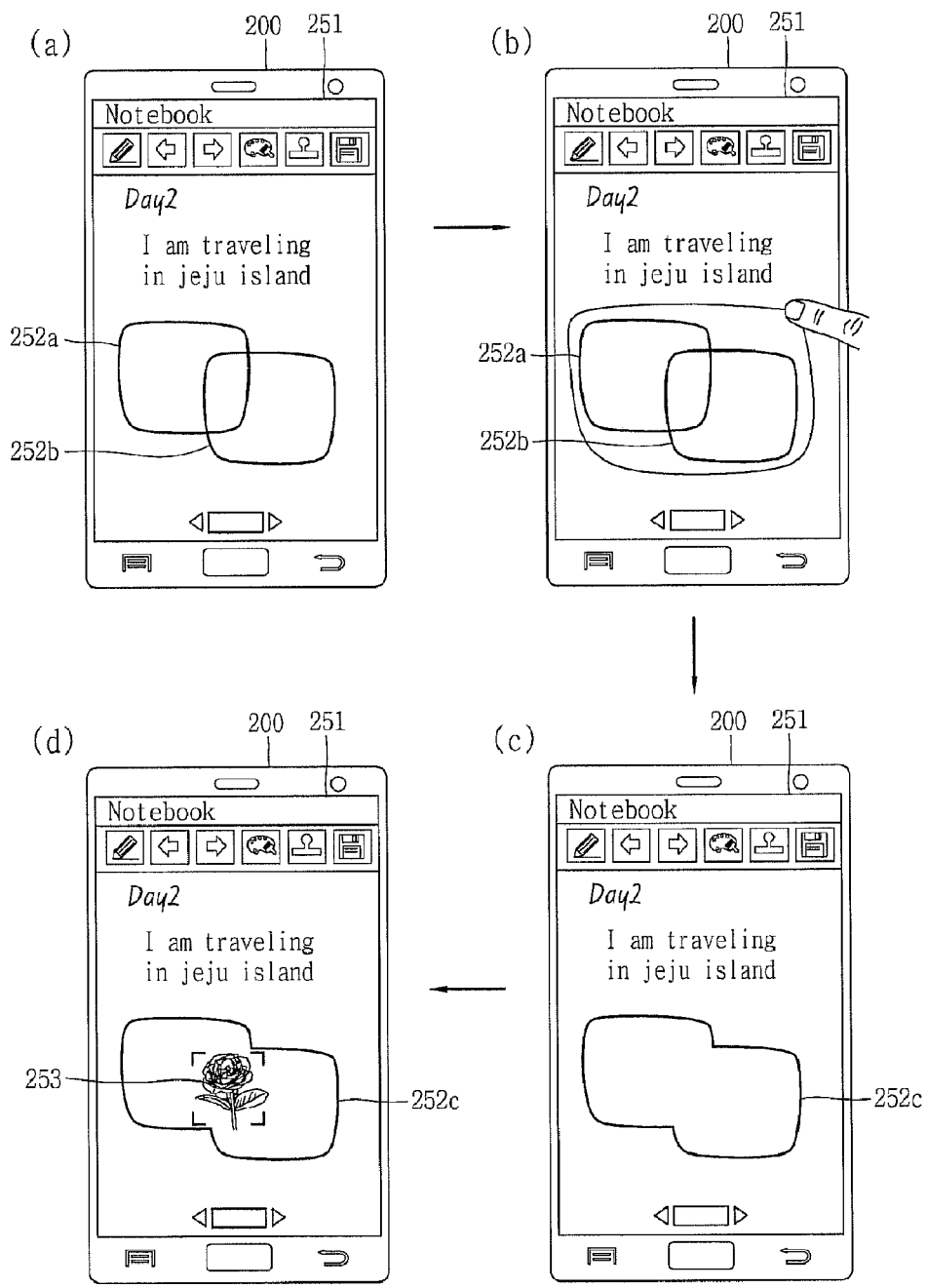

FIGS. 14 to 16 are conceptual views illustrating an operational example of the mobile terminal 200 in FIG. 3, respectively. The mobile terminal 200 includes the camera unit 121 (please see FIG. 1), the display unit 251 (please see FIG. 1) and the control unit 180 (please see FIG. 1).

Referring to FIGS. 14 and 15, the control unit 180 may designate regions corresponding to a number of times of touch inputs sensed on the screen information.

In detail, referring to FIGS. 14(a) and 15(a), the control unit 180 may designate a first region 252a on the basis of a touch input sensed on the screen information.

Thereafter, referring to FIGS. 14(b) and 15(b), the control unit 180 may designate second to fourth regions 252b to 252d on the basis of a number of times of touch inputs sensed on the screen information after the designating of the first region 252a.

Thereafter, referring to FIGS. 14(c) and 15(c), when a drag input for generating a region surrounding the first to fourth regions 252a to 252d is sensed, the control unit 180 may generate a fifth region 252e enclosing the first to fourth regions 252a to 252d. As the fifth region 252e is generated, the control unit 180 may execute the camera mode in which the camera unit 121 is activated.

FIG. 14(d) illustrates an embodiment in which a preview image received by the camera unit 121 in real time is divided into a plurality of sections and displayed in the first to fourth regions 252a to 252d.

In detail, although not shown, the control unit 180 may divide the preview image received by the camera unit 121 in real time into a plurality of sections. For example, the control unit 180 may separately display first to fourth sections 253a to 253d of the preview image divided into the four sections, in the first to fourth regions 252a to 252d.

Thereafter, referring to FIG. 14(d), when a touch input applied to the first to fourth sections 253a to 253d of the preview image is sensed, the camera unit 121 may capture an image. The control unit 180 may divide the captured image into a plurality of sections. The control unit 180 may separately display the first to fourth sections 254a to 254d of the captured image which has been divided into the four sections, in the first to fourth regions 252a to 252d.

Meanwhile, although not shown, when a touch input applied to only the first section 253a of the preview image is sensed, the camera unit 121 may capture an image, and display only the first section of the captured image in the first region 252a. Accordingly, the second to fourth sections 253b to 253d of the preview image may still be displayed in the second to fourth regions 252b to 252d.

Meanwhile, FIG. 15(d) illustrates an embodiment in which all the preview images received by the camera unit 121 in real time, in the first to fourth regions 252a to 252d.

In detail, although not shown, the control unit 180 may separately display preview images received by the camera unit 121 in real time, in the first to fourth regions 252a to 252d.

Thereafter, referring to FIG. 15(d), when four touch inputs sequentially applied to the first to fourth sections 253a to 253d, respectively, are sensed, the camera unit 121 may capture the images, respectively, four times. The control unit 180 may display the first to fourth images 254a to 254d which have been sequentially captured, in the first to fourth regions 252a to 252d, respectively.

Referring to FIG. 16, when a plurality of regions overlap, the control unit 180 may merge the overlap regions.

In detail, referring to FIG. 16(a), the control unit 180 may designate first and second regions 252a and 252b on the basis of a touch input sensed on screen information. Here, at least portions of the first and second regions 252a and 252b may overlap.

Thereafter, referring to FIG. 16(b), when a drag input for generating a region surrounding the first and second regions 252a and 252b is sensed, referring to FIG. 16(c), the control unit 180 may merge the first and second regions 252a and 252b to generate a third region 252c.

Thereafter, referring to FIG. 16(d), as the third region 252c is generated, the control unit 180 may execute the camera mode in which the camera unit 121 is activated. As illustrated, the control unit 180 may display the preview image 253 received by the camera unit 121 in real time, in the third region 252c.

Although not shown, when a touch input applied to the preview image 253 is sensed, the control unit 180 may control the camera unit 121 to perform capturing on the received image. Accordingly, the camera unit 121 may capture an image.

Figure 17:
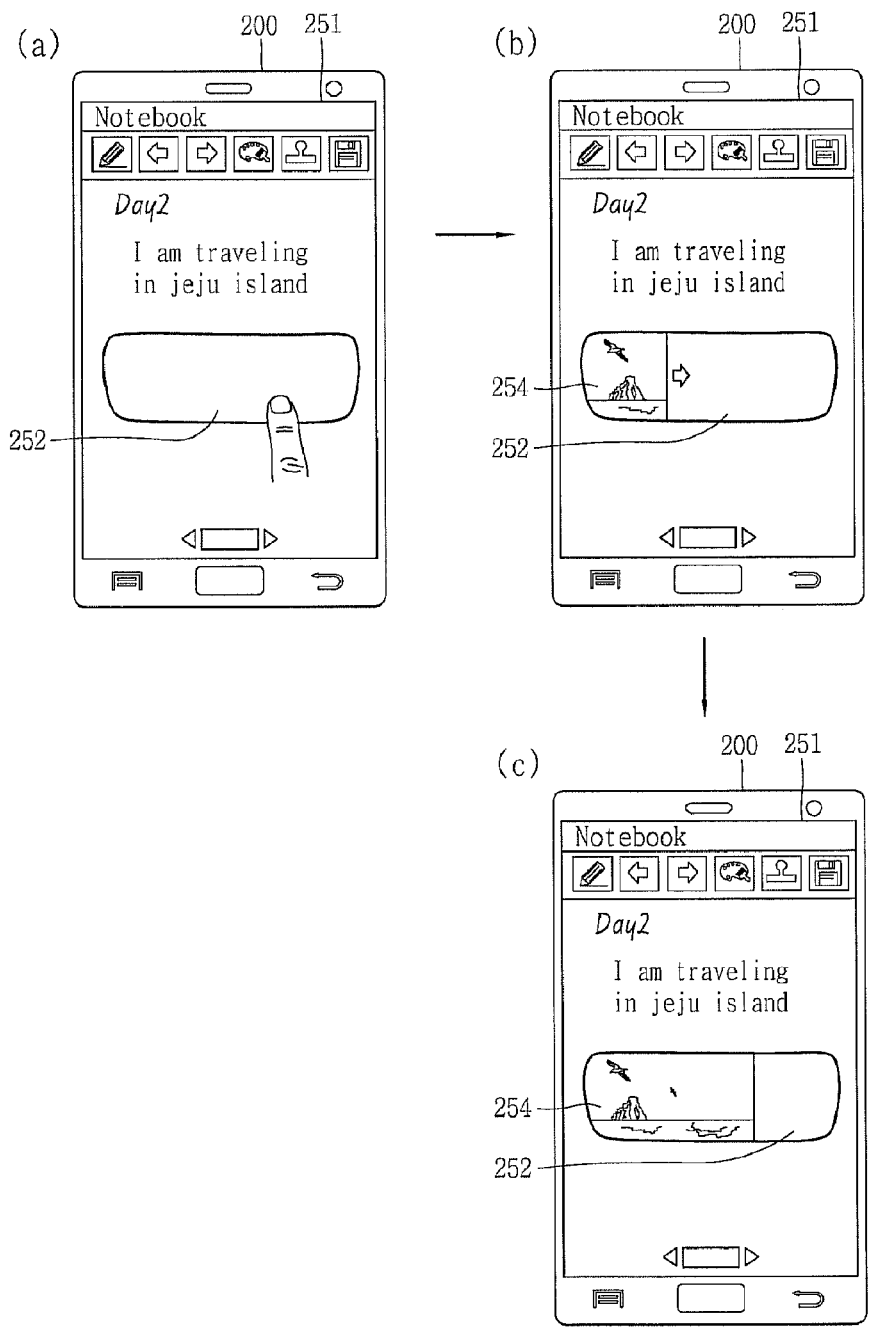

FIG. 17 is a conceptual view illustrating an operational example of the mobile terminal 200 in FIG. 3. The mobile terminal 200 includes the camera unit 121 (please see FIG. 1), the display unit 251 (please see FIG. 1), and the control unit 180 (please see FIG. 1).

Referring to FIG. 17(a), the control unit 128 may designate a region 252 on the basis of a touch input sensed on screen information. Here, the control unit 180 may detect whether a ratio between a width and a length of the designated region 252 corresponds to a pre-set ratio for panorama photographing.

Here, panorama photographing refers to photographing a plurality of scenes by moving a lens of the camera unit 121 in order to photograph a wide range of scene. The control unit 180 may connect a plurality of captured images to generate a panorama image.

When a ratio between a width and a length of the designated region 252 corresponds to a pre-set ratio for panorama photographing, as illustrated in FIG. 17(b), the control unit 180 may control the camera unit 121 to perform panorama photographing on images received by the camera unit 121.

Accordingly, as illustrated in FIGS. 17(b) and 17(c), the captured images 254 may be sequentially displayed in the designated region 252.

Figure 18:
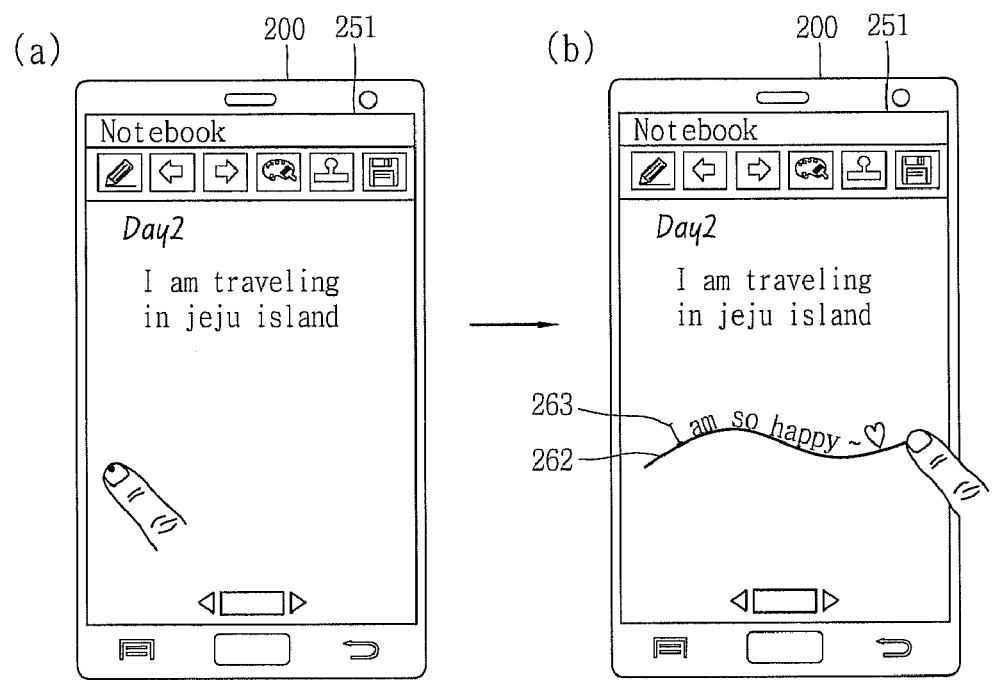
Figure 19:
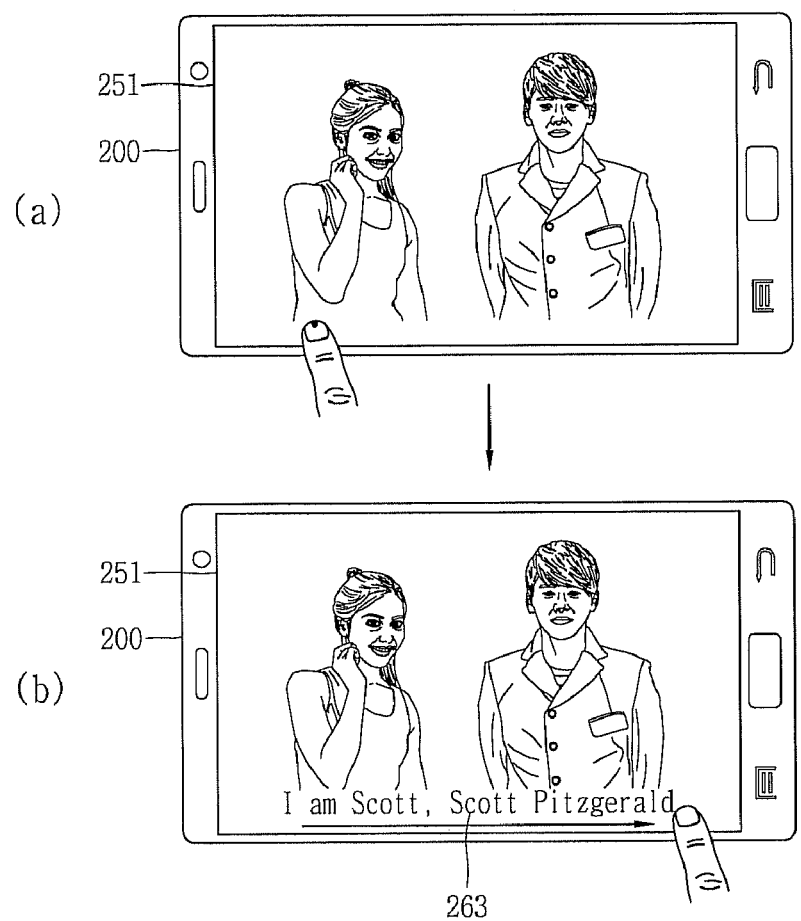
Figure 20:
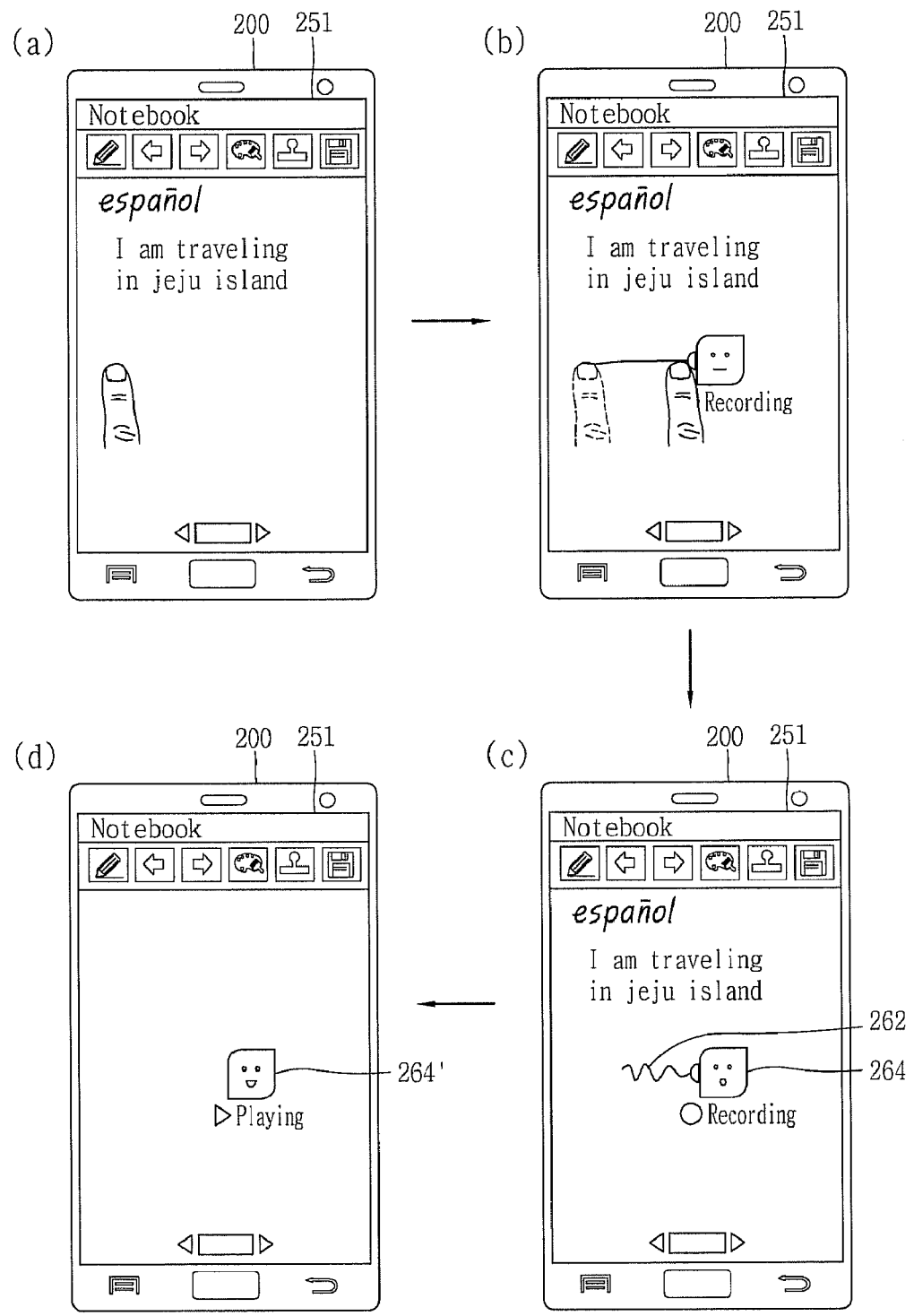

FIGS. 18 to 20 are conceptual views illustrating an operational example of the mobile terminal 200 in FIG. 3, respectively. The mobile terminal 200 includes the camera unit 121 (please see FIG. 1), the display unit 251 (please see FIG. 1), and the control unit 180 (please see FIG. 1).

Referring to FIGS. 18 and 19, the control unit 180 may dispose pre-set text data along a trace of a touch input sensed on screen information.

In detail, referring to FIGS. 18(a) and 18(b), when a touch input applied to one spot of the screen information is sensed and the touch input continues in a certain direction, the control unit 180 may trace the touch input.

Thereafter, the control unit 180 may dispose pre-set text data (e.g., the most recently copied text data) 262 along the trace of the touch input on the screen information. Also, as illustrated, the control unit 180 may display a line 262 indicating the trace of the touch input on the screen information.

Similarly, referring to FIGS. 19(a) and 19(b), the display unit 251 may display video data being reproduced (or being played). The control unit 180 may dispose pre-set text data (e.g., text data corresponding to subtitle information) 263 along the trace of the touch input sensed on the video data, on the video data.

Although not shown, when the audio output unit 152 (please see FIG. 1) is outputting music in a state in which screen information is being displayed on the display unit 251, the control unit 180 may dispose text data corresponding to lyrics information on the screen information along a trace of a touch input sensed on the screen information.

Referring to FIG. 20, the control unit 180 may execute an application during a pre-set period of time, on the basis of length information of a touch input sensed on the screen information.

In detail, referring to FIGS. 20(a) and 20(b), in a case in which a touch input applied to one spot of the screen information is sensed and the touch input continues in a certain direction, the control unit 180 may display a line 262 along the trace of the touch input on the screen information. Also, the control unit 180 may display an icon 264 corresponding to a particular application (e.g., a recording application) on the screen information.

Thereafter, when the touch input is released, referring to FIG. 20(c), the control unit 180 may execute a recording application. In this case, the control unit may set a duration in which the recording application is to be executed, according to the length information of the line 262. While the recording application is being executed, the control unit 180 may change a shape of the line 262, and may reduce the length of the line 262 with the passage of time.

Thereafter, when the pre-set duration has lapsed, the control unit 180 may terminate the recording application. Also, as illustrated in FIG. 20(d), the control unit 180 may display an icon (hereinafter, referred to as a 'reproduction icon (or play icon)') 264' corresponding to an application for reproducing recorded content, on the screen information.

Although not shown, in a case in which the reproduction icon 264' is selected, the control unit 180 may output recorded voice data.

In the embodiments of the present invention, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet). The computer may include a control unit of a terminal.

The mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A terminal comprising:
a body having a front surface, a rear surface and a lateral surface;
a front camera mounted on the front surface and a rear camera mounted on the rear surface, and configured to process an image, wherein the rear camera supports a different number of pixels than the front camera;
a touch screen mounted on the front surface, and configured to receive a touch input and display an execution screen of a note application comprising at least one note, wherein the touch screen comprises a touch sensor and a display unit;
a controller operably coupled with the front camera, the rear camera, and the touch screen and configured to:
receive a first touch input applied to the display unit via the touch sensor;
in response to the first touch input, designate a first area on the execution screen based on the first touch input and display a preview image processed via at least one of the front camera or the rear camera in the first area of the execution screen;
wherein the first area is designated based on a trace of the first touch input, and an outline is displayed along the trace of the first touch input on the execution screen;
receive a second touch input applied to the first area of the execution screen via the touch sensor;

in response to the second touch input applied to the first area where the preview image is displayed, capture the preview image displayed in the first area of the execution screen.

2. The terminal of claim 1, wherein the first area that includes the preview image is displayed separately from the at least one note on the execution screen of the note application.

3. The terminal of claim 1, wherein the second touch input is applied to the preview image.

4. The terminal of claim 1, wherein the captured image is displayed in the first area.

5. The terminal of claim 4, wherein the captured image is displayed in a second area of the execution screen in response to a touch drag input.

6. The terminal of claim 4, wherein the controller is further configured to display menu icons associated with the camera or the first area.

7. The terminal of claim 6, wherein the menu icons include an icon for deleting the captured image.

8. The terminal of claim 1, wherein a new preview image is displayed in the first area in response to a third touch input applied to the captured image displayed in the first area, wherein the third touch input is different from the first and the second touch inputs.

9. The terminal of claim 1, wherein the controller is further configured to display the preview image in the first area and at least one second area of the execution screen.

10. The terminal of claim 9, wherein the at least one second area is designated based on a trace of a fourth touch input.

11. The terminal of claim 10, wherein a contour of the at least one second area is displayed along the trace of the fourth touch input.

12. The terminal of claim 11, wherein the at least one second area is designated within the contour.

13. The terminal of claim 9, wherein the preview image is displayed corresponding to each of the first area and the at least one second area.

14. The terminal of claim 13, wherein the preview image comprises a plurality of parts and the plurality of parts of the preview image are displayed corresponding to each of the first area and the at least one second area.

15. The terminal of claim 1, wherein a memo is displayed on the execution screen with the preview image.

16. A terminal comprising:
a body having a front surface, a rear surface and a lateral surface;
a front camera mounted on the front surface and a rear camera mounted on the rear surface, and configured to process an image, wherein the rear camera supports a different number of pixels than the front camera;
a touch screen mounted on the front surface, and configured to receive a touch input and display an execution screen of a note application comprising at least one note, wherein the touch screen comprises a touch sensor and a display unit;
a controller operably coupled with the front camera, the rear camera, and the touch screen and configured to:
receive a first touch input applied to the display unit via the touch sensor;
in response to the first touch input, designate a first area on the execution screen based on the first touch input, execute a camera function to display a preview image processed via at least one of the front camera or the rear camera, and display the preview image processed via the at least one of the front camera or the rear camera in the first area of the execution screen;
wherein the first area is designated based on a trace of the first touch input, and an outline of the first area is displayed along the trace of the first touch input on the execution screen;
receive a second touch input applied to the first area of the execution screen via the touch sensor;
in response to the second touch input applied to the first area where the preview image is displayed, capture the preview image displayed in the first area of the execution screen.

17. A terminal comprising:
a body having a front surface, a rear surface and a lateral surface;
a front camera mounted on the front surface and a rear camera mounted on the rear surface, and configured to process an image, wherein the rear camera supports a different number of pixels than the front camera;
a touch screen mounted on the front surface, and configured to receive a touch input and display an execution screen of a note application comprising at least one note, wherein the touch screen comprises a touch layer and an organic light emitting diode display;
a controller operably coupled with the front camera, the rear camera, and the touch screen and configured to:
receive a first touch input via the touch layer;
in response to the first touch input, designate a first area on the execution screen based on the first touch input and display a preview image processed via at least one of the front camera or the rear camera in the first area of the execution screen;
wherein the first area is designated based on a trace of the first touch input, and an outline of the first area is displayed along the trace of the first touch input on the execution screen;
receive a second touch input applied to the first area of the execution screen displayed on the organic light emitting diode display via the touch layer;
in response to the second touch input applied to the first area where the preview image is displayed, capture the preview image displayed in the first area of the execution screen.

18. A method of controlling a terminal comprising:
displaying, on a touch screen of the mobile terminal, an execution screen of a note application comprising at least one note;
receiving a first touch input via the touch screen displaying the execution screen comprising the at least one note;
in response to the first touch input:
designating a first area on the execution screen based on the first touch input,
executing a camera function to receive a preview image processed via a camera of the mobile terminal, and
displaying the preview image in the first area of the execution screen,
receiving a second touch input different from the first touch input; and
in response to the second touch input applied to the first area on the execution screen, capturing the preview image displayed in the first area of the execution screen,
wherein the first area is designated based on a trace of the first touch input, and a contour of the first area is displayed along the trace of the first touch input on the execution screen, and
wherein the first area is designated within the contour.

19. The method of claim 18, wherein the first area that includes the preview image is displayed separately from the at least one note on the execution screen of the note application.

20. The method of claim 18, wherein the second touch input is applied to the preview image.

21. The method of claim 18, wherein the captured image is displayed in the first area.

22. The method of claim 21, wherein the captured image is displayed in a second area of the execution screen in response to a touch drag input.

23. The method of claim 21, further comprising:
displaying menu icons associated with the camera or the first area.

24. The method of claim 23, wherein the menu icons include an icon for deleting the captured image.

25. The method of claim 18, wherein a new preview image is displayed in the first area in response to a third touch input applied to the captured image displayed in the first area, wherein the third touch input is different from the first and the second touch inputs.

26. The method of claim 18, further comprising:
displaying the preview image in the first area and at least one second area of the execution screen.

27. The method of claim 26, wherein the at least one second area is designated based on a trace of a fourth touch input.

28. The method of claim 27, wherein a contour of the at least one second area is displayed along the trace of the fourth touch input.

29. The method of claim 26, wherein the at least one second area is designated within the contour.

30. The method of claim 26, wherein the preview image is displayed corresponding to each of the first area and the at least one second area.

* * * * *